US012743990B2

(12) United States Patent
Luo et al.

(10) Patent No.: US 12,743,990 B2
(45) Date of Patent: Sep. 22, 2026

(54) LIGHT EMITTING DIODE (LED) DISPLAY CIRCUIT ADJUSTING VALUE OF REFERENCE CURRENT IN CURRENT MIRROR BRANCHES

(71) Applicant: Huawei Technologies Co., Ltd., Shenzhen (CN)

(72) Inventors: Kun Luo, Shenzhen (CN); Cuiping Zhang, Shenzhen (CN); Hezi Qiu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/989,381

(22) Filed: Dec. 20, 2024

(65) Prior Publication Data

US 2025/0131873 A1 Apr. 24, 2025

Related U.S. Application Data

(63) Continuation of application No. PCT/CN2023/099505, filed on Jun. 9, 2023.

(30) Foreign Application Priority Data

Jun. 23, 2022 (CN) ......................... 202210719596.5
Oct. 28, 2022 (CN) ......................... 202211337635.1

(51) Int. Cl.
*G09G 3/32* (2016.01)

(52) U.S. Cl.
CPC ........... *G09G 3/32* (2013.01); *G09G 2310/08* (2013.01); *G09G 2330/021* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS 6,091,203 A * 7/2000 Kawashima ......... G09G 3/3241 345/55
2002/0196212 A1* 12/2002 Nishitoba ............ G09G 3/3241 345/76

(Continued)

FOREIGN PATENT DOCUMENTS

CN 1482583 A 3/2004
CN 109922572 A 6/2019

*Primary Examiner* — Ke Xiao
*Assistant Examiner* — Nelson Lam
(74) *Attorney, Agent, or Firm* — Conley Rose, P.C.

(57) ABSTRACT

A display circuit includes a plurality of current source branches and a plurality of pixel branches. Each current source branch includes a first transistor and a control circuit. Each pixel branch includes a second transistor, a pulse width control switch transistor, and a pixel unit that are connected in series. The turned-on first transistor and the turned-on second transistor form a current mirror structure. In the current mirror structure, there is a proportional relationship between a current flowing through each of the plurality of first transistors and a current flowing through the turned-on second transistor. Whether each first transistor is turned on is controlled through the control circuit, to adjust a value of the current flowing through each pixel unit through the second transistor.

20 Claims, 13 Drawing Sheets

(58) Field of Classification Search
CPC .. G09G 3/3233; G09G 3/3241; G09G 3/3258; G09G 3/3266; G09G 3/3275; G09G 3/3283; G09G 3/3291
USPC ........................................................ 345/76–83
See application file for complete search history.

(56) References Cited

U.S. PATENT DOCUMENTS

| | | | | |
|---|---|---|---|---|
| 2005/0122052 | A1* | 6/2005 | Horiuchi | G09G 3/325 315/169.2 |
| 2005/0140596 | A1* | 6/2005 | Lee | G09G 3/3283 345/76 |
| 2006/0158396 | A1 | 7/2006 | Jo | |
| 2006/0290615 | A1* | 12/2006 | Kim | G09G 3/3216 345/76 |
| 2007/0046588 | A1* | 3/2007 | Tsai | G09G 3/3241 345/76 |
| 2007/0120796 | A1 | 5/2007 | Marx | |
| 2007/0182671 | A1* | 8/2007 | Nathan | G09G 3/3266 345/76 |
| 2007/0279340 | A1* | 12/2007 | Takahashi | G09G 3/3241 345/76 |
| 2008/0036385 | A1* | 2/2008 | Maede | G09G 3/3216 315/169.3 |
| 2009/0115704 | A1* | 5/2009 | Kane | G09G 3/3241 345/76 |
| 2009/0231241 | A1* | 9/2009 | Abe | G09G 3/2011 345/76 |
| 2010/0289779 | A1* | 11/2010 | Routley | G09G 3/3216 345/205 |
| 2011/0069099 | A1* | 3/2011 | Sun | G09G 3/3241 345/82 |
| 2013/0321249 | A1* | 12/2013 | Kimura | G09G 3/3233 345/76 |
| 2022/0044643 | A1 | 2/2022 | Gu et al. | |
| 2024/0224397 | A1* | 7/2024 | Huang | G09G 3/32 |

* cited by examiner

LIGHT EMITTING DIODE (LED) DISPLAY CIRCUIT ADJUSTING VALUE OF REFERENCE CURRENT IN CURRENT MIRROR BRANCHES

CROSS-REFERENCE TO RELATED APPLICATIONS

This is a continuation of International Patent Application No. PCT/CN2023/099505 filed on Jun. 9, 2023, which claims priority to Chinese Patent Application No. 202210719596.5 filed on Jun. 23, 2022 and Chinese Patent Application No. 202211337635.1 filed on Oct. 28, 2022. All of the aforementioned patent applications are hereby incorporated by reference in their entireties.

TECHNICAL FIELD

The present disclosure relates to the field of light-emitting diode (LED) driving technologies, and in particular, to a display circuit, a display method, a display apparatus, and an electronic device.

BACKGROUND

Currently, a drive mode of an LED is current drive. Current drive means providing a constant drive current for the LED, in other words, a current value of the drive current is a fixed value, and then adjusting, by using a pulse-width modulation (PWM) method, a proportion of conduction time of a branch in which the LED is located.

An implementation of current drive is: providing a constant reference current, generating a plurality of constant drive currents based on the constant reference current, and respectively outputting the plurality of constant drive currents to LEDs on a plurality of corresponding branches. In this manner, because a value of the reference current cannot be adjusted, the constant reference current causes a waste of power consumption. When there are few branches that need to be conducted in the plurality of branches, providing a reference current with a large value also causes a waste of power consumption.

SUMMARY

Embodiments of the present disclosure provide a display circuit, a display method, a display apparatus, and an electronic device, to adjust a current value of a reference current.

To achieve the foregoing objectives, the following technical solutions are used in embodiments of the present disclosure.

According to a first aspect, a display circuit is provided. The display circuit includes a plurality of current source branches and a plurality of pixel branches. Each of the plurality of current source branches includes a control circuit and a first transistor, and each control circuit is coupled to a corresponding first transistor. Each of the plurality of pixel branches includes a second transistor, a pulse width control switch transistor, and a pixel unit that are connected in series, the second transistor is coupled to a gate of the first transistor, and the second transistor and the first transistor form a current mirror. The pulse width control switch transistor is configured to control conduction and disconnection of the corresponding pixel branch. The control circuit is configured to control turn-on and turn-off of the corresponding first transistor.

In embodiments of the present disclosure, the first transistor in each of the plurality of current source branches and the second transistor in each of the plurality of pixel branches form the current mirror structure. In the current mirror structure, there is a fixed proportional relationship between a current value of a second current flowing through the first transistor and a current value of a first current flowing through the second transistor. Based on a characteristic of the current mirror, the proportional relationship is determined by a proportional relationship between a first ratio and a second ratio. The first ratio is a ratio $W_1/L_1$ of a channel width $W_1$ of the first transistor to a channel length $L_1$. The second ratio is determined by a ratio $W_2/L_2$ of a channel width $W_2$ of the second transistor to a channel length $L_2$. A quantity of conducted current source branches in the plurality of current source branches is controlled, so that a total current value of second currents output by the plurality of current source branches may be controlled, to adjust the values of the first currents flowing through the pixel branches. The first current flowing through the pixel branch is output to the pixel unit as a drive current, to drive the pixel unit to emit light. The second current, as a reference current for determining the value of the first current, always exists. When the pixel unit does not need to emit light, the first current does not need to flow through the pixel branch, but the current source branch still outputs the second current used as the reference current, which causes a waste of power consumption. In addition, when a plurality of pixel branches are disposed, a larger quantity of pixel branches requires a first current with a larger current, so that the pixel branch can be quickly responded for drive. To ensure that the first currents enable all pixel units in the plurality of pixel branches to still be quickly responded within specified drive time in an application scenario in which all the pixel units in the plurality of pixel branches emit light simultaneously, the first currents need to be correspondingly set to be as large as possible, and the total current value of the second currents output by the current source branches also needs to be correspondingly set to be as large as possible. However, in this case, if only pixel units in a part of pixel branches in the plurality of pixel branches need to emit light, although the first currents and the second currents that are set to large values can ensure that the pixel units are quickly responded within the specified drive time, some power consumption is still wasted. To avoid the foregoing waste of power consumption, in embodiments of the present disclosure, the plurality of current source branches are disposed in the current source branches, and each current source branch is used to output one second current. Whether each of the plurality of current source branches outputs one second current is adjusted, to dynamically adjust the total current value of the second currents output by the current source branches. Further, the current values of the first currents are adjusted based on the total current value of the second currents.

In a possible implementation, the control circuit includes a first switch and a second switch, the first switch is coupled between a first electrode of the first transistor and the gate of the first transistor, and the second switch is coupled between a second electrode of the first transistor and the gate of the first transistor.

In embodiments of the present disclosure, when the first transistor is turned on, and the current mirror structure is formed between the turned-on first transistor and the second transistor, when the gate of the first transistor is coupled to a gate of the second transistor, a voltage of the gate of the first transistor is equal to a voltage of the gate of the second transistor. When the second electrode of the first transistor is coupled to the gate of the first transistor, the first transistor is in a turn-off state. In this case, the first electrode of the first transistor does not output the second current, and the total current value of the second currents output by the plurality of first transistors is decreased. When a first electrode of a first transistor is coupled to a gate of the first transistor, the first transistor is turned on, the first electrode and a second electrode of the first transistor are conducted, and a second current flows through the first transistor, and a current mirror (CM) structure is formed between the first transistor and a second transistor. For the plurality of current source branches, all turned-on first transistors in a plurality of current source branches and second transistors form current mirror structures, and a sum of a plurality of second currents output by all the turned-on first transistors is used as a reference current. There is a proportional relationship between a first current flowing through the turned-on second transistor and the total current of all the second currents. Based on a characteristic of the current mirror, the proportional relationship is determined by a proportional relationship between a first ratio and a second ratio. The first ratio is a ratio $W_1/L_1$ of a channel width $W_1$ of the first transistor to a channel length $L_1$, and the second ratio is a ratio $W_2/L_2$ of a channel width $W_2$ of the second transistor to a channel length $L_2$.

In a possible implementation, for different current source branches, a ratio of a channel width of a first transistor in a first current source branch to a channel length is equal to a ratio of a channel width of a first transistor in a second current source branch to a channel length.

In embodiments of the present disclosure, current values of second currents output by different current source branches may be equal. For example, there are two current source branches: the first current source branch and the second current source branch. In this case, the channel width of the first transistor in the first current source branch is $W_{11}$, the channel length of the first transistor in the first current source branch is $L_{11}$, the channel width of the first transistor in the second current source branch is $W_{12}$, and the channel length of the first transistor in the second current source branch is $L_{12}$. When $W_{11}=W_{12}$ and $L_{11}$-$L_{12}$, a current value of a second current output by the first transistor of the first current source branch is equal to a current value of a second current output by the first transistor of the second current source branch. In this case, the sum of the second currents can be adjusted only by adjusting the quantity of conducted current source branches.

In a possible implementation, for different current source branches, a ratio of a channel width of a first transistor in a first current source branch to a channel length is k times a ratio of a channel width of a first transistor in a second current source branch to a channel length.

In embodiments of the present disclosure, current values of second currents output by different current source branches increase by a specific proportional coefficient. For example, there are two current source branches: the first current source branch and the second current source branch. In this case, the channel width of the first transistor in the first current source branch is $W_{11}$, the channel length of the first transistor in the first current source branch is $L_{11}$, the channel width of the first transistor in the second current source branch is $W_{12}$, and the channel length of the first transistor in the second current source branch is $L_{12}$. When a ratio of a value of $W_{11}/L_{11}$ to a value of $W_{12}/L_{12}$ is k, there is a k-fold proportional relationship between a current value of a second current output by the first transistor of the first current source branch and a current value of a second current output by the first transistor of the second current source branch. In this case, in addition to adjusting the quantity of current source branches that is conducted in the plurality of current source branches, the sum of the second currents may further be adjusted by selecting to turn on a first transistor with another ratio of a channel width to a channel length.

In a possible implementation, whether each of the plurality of current source branches outputs the second current is controlled based on light-emitting state information.

For example, the light-emitting state information includes at least one of light-emitting intensity information of the plurality of pixel units and light-emitting quantity information of the plurality of pixel units.

In embodiments of the present disclosure, when the light-emitting state information includes the light-emitting intensity information, a current value of a first current flowing through the pixel unit and a device parameter of the pixel unit determine maximum light-emitting intensity of the pixel unit. The total current value of the second currents output by the current source branches is controlled based on the maximum light-emitting intensity required by the pixel unit, to control the current value of the first current flowing through the pixel unit in the pixel branch. In this case, whether each of the plurality of current source branches outputs the second current is controlled, to adjust the total current value of the second currents output by the current source branches, so as to adjust the current value of the first current based on the second current. When the light-emitting state information includes the light-emitting quantity information, in embodiments of the present disclosure, the value of the first current is determined based on the second current. When there are more pixel units that need to emit light, there are more pixel branches through which first currents need to flow. When a quantity of pixel branches through which first currents need to flow is larger, the total current value of the second currents output by the current source branches is larger, and the first current flowing through the pixel branch rises more quickly to a stable current value that is sufficient to drive the pixel unit to emit light, that is, drive time is shorter. When there are more pixel units that need to emit light, to ensure that each light-emitting pixel unit can emit light normally within the specified drive time, more current source branches need to be controlled to output more second currents, to increase the total current value of the output second currents. When a quantity of pixel units that need to emit light is small, on the basis of ensuring that each light-emitting pixel unit can emit light normally within the specified drive time, a quantity of current source branches that output the second current needs to be controlled to be decreased, to reduce the total current value of the output second currents as much as possible.

In a possible implementation, a withstand voltage of the pulse width control switch transistor is different from a withstand voltage of the second transistor.

In embodiments of the present disclosure, stability of the pixel branch can be improved by increasing the withstand voltage of the pulse width control switch transistor and/or the withstand voltage of the second transistor. A withstand voltage is an inherent characteristic of a transistor, and is related to a ratio of an epitaxial layer resistance to a total turn-on resistance in the transistor structure. When the ratio of the epitaxial layer resistance to the total turn-on resistance is small, the withstand voltage is also small. For a transistor with a small withstand voltage, a small current may be used to drive the transistor. When the ratio of the epitaxial layer resistance to the total turn-on resistance is large, the withstand voltage is also large. For a transistor with a large withstand voltage, a large current is required to drive the transistor. The withstand voltage is used as a device parameter of the transistor, and is used to describe working performance of the transistor. The withstand voltage may be used to express drive performance, a capability of withstanding a voltage difference, and the like of the transistor. In actual application, a voltage at two ends of the pixel unit may be lower than an actual preset voltage due to a process deviation, a leakage current, and the like, and a voltage difference in a circuit branch including one pixel branch has been arranged based on the preset voltage. When the voltage at the two ends of the pixel unit is lower than the actual preset voltage, for example, the preset voltage difference between the two ends of the pixel unit is 2.5 volts (V), but due to the process deviation and the leakage current problem, the voltage difference between the two ends of the pixel unit is actually only 1.5 V or lower than 1.5 V. In this case, a second transistor and a pulse width control switch transistor that are located on the circuit branch need to bear a larger voltage difference. In this case, if the second transistor and the pulse width control switch transistor have low withstand voltages, the second transistor and the pulse width control switch transistor may be damaged because they cannot withstand the larger voltage difference. Consequently, a stability problem is caused. A solution is to increase the withstand voltages of the second transistor and the pulse width control switch transistor. This requires a larger second current and a larger first current to enable the circuit branch to be quickly conducted and implement a quick response of the pixel unit within the specified drive time. This manner undoubtedly greatly increases power consumption of a system. Therefore, for one pixel branch, a withstand voltage of one of a pulse width control switch transistor and a second transistor may be increased, to improve stability of the pixel branch, and avoid excessive increase of power consumption of the pixel branch.

In a possible implementation, the pulse width control switch transistor is coupled between the second transistor and the pixel unit.

In embodiments of the present disclosure, the pulse width control switch transistor is coupled between the pixel unit and the second transistor. In this way, the pulse width control switch transistor bears a specific trans-voltage at a middle position of the pixel branch, to ensure stability of the pixel branch.

In a possible implementation, the withstand voltage of the pulse width control switch transistor is greater than a power supply voltage of the pixel branch.

In embodiments of the present disclosure, the withstand voltage of the pulse width control switch transistor may be appropriately increased. Stability of the circuit is improved through the pulse width control switch transistor. Especially, when the withstand voltage of the pulse width control switch transistor is set to be greater than the power supply voltage of the pixel branch, stability of the circuit can be significantly improved, and a risk of burning the pulse width control switch transistor and the second transistor can be reduced. In addition, the pulse width control switch transistor may be disposed between the second transistor and the pixel unit. When the voltage difference between the two ends of the pixel unit is less than a preset condition, the pulse width control switch transistor may play a good buffering role, to ensure stability of the circuit branch.

In some possible implementations, the pixel unit includes an LED.

In embodiments of the present disclosure, the LED is driven via the first current, to implement light emitting through the LED.

According to a second aspect, an embodiment of the present disclosure further provides a display method, based on a display circuit. The display circuit includes a plurality of current source branches and a plurality of pixel branches. Each of the plurality of current source branches includes a control circuit and a first transistor, and each control circuit is coupled to a corresponding first transistor. Each of the plurality of pixel branches includes a second transistor, a pulse width control switch transistor, and a pixel unit that are connected in series, the second transistor is coupled to a gate of the first transistor, and the second transistor and the turned-on first transistor form a current mirror. The method includes: controlling conduction and disconnection of the corresponding pixel branch through the pulse width control switch transistor; and controlling, through the control circuit, whether the corresponding first transistor is turned on based on a quantity of conducted pixel branches.

In embodiments of the present disclosure, if quantities of conducted pixel branches are different, first currents of different values are required to implement quick responses of pixel units in the pixel branches. Based on a specific value of a required first current, a corresponding quantity of first transistors needs to be turned on, to form a current mirror by turning on the corresponding quantity of first transistors and a corresponding quantity of second transistors, so as to adjust the current value of the first circuit, and reduce power consumption as much as possible while meeting a quick response of the pixel unit.

In a possible implementation, the control circuit includes a first switch and a second switch, the first switch is coupled between a first electrode of the first transistor and the gate of the first transistor, and the second switch is coupled between a second electrode of the first transistor and the gate of the first transistor. The method specifically includes: controlling the first switch to be turned on and the second switch to be turned off, to control the corresponding first transistor to be turned on; or controlling the first switch to be turned off and the second switch to be turned on, to control the corresponding first transistor to be turned off.

In a possible implementation, whether each of the plurality of current source branches outputs a second current is controlled based on light-emitting state information. The light-emitting state information includes at least one of light-emitting intensity information of the plurality of pixel units and light-emitting quantity information of the plurality of pixel units.

In some possible implementations, for different current source branches, a ratio of a channel width of a first transistor in a first current source branch to a channel length is equal to a ratio of a channel width of a first transistor in a second current source branch to a channel length. In the method, an operation of controlling, through the control circuit based on a quantity of conducted pixel branches, whether the corresponding first transistor is turned on includes: determining, based on the quantity of conducted pixel branches, a first quantity; controlling, through the control circuit, the first quantity of first transistors to be turned on.

In embodiments of the present disclosure, a ratio of a channel width of the first transistor corresponding to each of the plurality of current source branches to a channel length is equal. In this case, in a current mirror formed by each first transistor and a second transistor, a ratio of a current value of a second current flowing through the first transistor to a current value of a first current flowing through the second transistor is also constant. In this case, only a quantity of first transistors that needs to be turned on needs to be determined based on a current value of a required first current.

In some possible implementations, for different current source branches, a ratio of a channel width of a first transistor in a first current source branch to a channel length is k times a ratio of a channel width of a first transistor in a second current source branch to a channel length. In the method, an operation of controlling, through the control circuit based on a quantity of conducted pixel branches, whether the corresponding first transistor is turned on includes: determining a first ratio based on the quantity of conducted pixel branches, where the first ratio is a ratio of a channel width of at least one first transistor to a channel length; and controlling, through the control circuit, the at least one first transistor corresponding to the first ratio to be turned on.

In embodiments of the present disclosure, ratios of channel widths of two different first transistors to channel lengths may be equal, or may not be equal. In this case, for a current mirror formed by a first transistor and a second transistor that have different ratios of channel widths to channel lengths, values of first currents flowing through the second transistor are also different. Therefore, the first ratio is determined based on the current value of the required first current. The first ratio may indicate a ratio of a channel width of a first transistor to a channel length, and then a corresponding first current is obtained by turning on the first transistor. Alternatively, the first ratio may indicate ratios of channel widths of the plurality of first transistors to channel lengths, and then the plurality of first transistors are turned on to obtain corresponding first currents.

In some possible implementations, the method further includes: controlling turn-on and turn-off of the pulse width control switch transistor via a pulse-width modulation signal; and when the pulse-width modulation signal is at a first level, controlling the pulse width control switch transistor to be turned on to control conduction of the corresponding pixel branch; or when the pulse-width modulation signal is at a second level, controlling the pulse width control switch transistor to be turned off to control disconnection of the corresponding pixel branch.

In some possible implementations, the method further includes: controlling display brightness of the pixel unit via the pulse-width modulation signal with different duty cycles.

In embodiments of the present disclosure, an example in which the pulse width control switch transistor is an N-type metal-oxide-semiconductor (NMOS) transistor is used. When the pulse-width modulation signal is a high-level signal, the pulse width control switch transistor is turned on, and an LED emits light. In addition, a duty cycle (that is, a ratio of an effective pulse width) of the pulse-width modulation signal modulated as the high-level signal may adjust light-emitting intensity of the LED. When the pulse-width modulation signal is a low-level signal, the pulse width control switch transistor is not turned on, and an LED does not emit light.

According to a third aspect, an embodiment of the present disclosure further provides a display apparatus, including the display circuit described in the first aspect. The display circuit is configured to emit light to display an image.

According to a fourth aspect, an embodiment of the present disclosure further provides an electronic device. The electronic device includes the display apparatus described in the third aspect, and the display apparatus is configured to emit light to display an image.

According to a fifth aspect, an embodiment of the present disclosure further provides a chip system. The chip system includes at least one processor and at least one interface circuit. The at least one processor and the at least one interface circuit may be interconnected through a line. The processor is configured to support the chip system in implementing functions or steps in the display method described in the second aspect. The at least one interface circuit may be configured to receive a signal from another apparatus (for example, a memory), or send a signal to another apparatus (for example, a communication interface). The chip system may include a chip, and may further include another discrete component.

According to a sixth aspect, an embodiment of the present disclosure further provides a computer-readable storage medium. The computer-readable storage medium includes instructions. When the instructions are run on the display apparatus, the chip system, or the electronic device, the display apparatus, the chip system, or the electronic device is enabled to perform functions or steps in the display method described in the second aspect.

According to a seventh aspect, an embodiment of the present disclosure further provides a computer program product including instructions. When the instructions are run on the display apparatus, the chip system, or the electronic device, the display apparatus, the chip system, or the electronic device is enabled to perform functions or steps in the display method described in the second aspect.

For technical effects of the second aspect, the third aspect, the fourth aspect, the fifth aspect, the sixth aspect, and the seventh aspect, refer to related descriptions of the technical effects of the first aspect.

DESCRIPTION OF EMBODIMENTS

Figure 1:
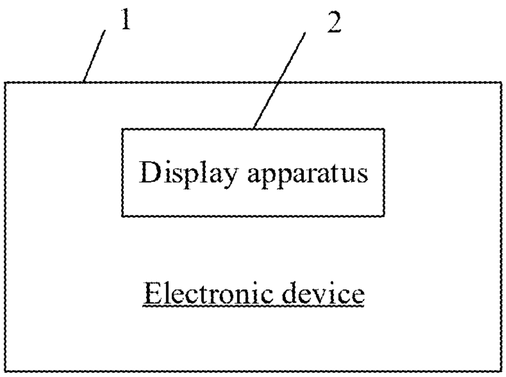
FIG. 1 is a diagram of a structure of an electronic device according to an embodiment of the present disclosure.

It should be noted that in embodiments of the present disclosure, terms such as "first" and "second" are merely used to distinguish between features of a same type, and cannot be understood as an indication of relative importance, a quantity, a sequence, or the like.

In embodiments of the present disclosure, the word like "example" or "for example" is used to represent giving an example, an illustration, or a description. Any embodiment or design scheme described as an "example" or "for example" in the present disclosure should not be explained as being more preferred or having more advantages than another embodiment or design scheme. To be precise, use of the word like "example" or "for example" is intended to present a relative concept in a specific manner.

The terms "coupling" and "connection" in embodiments of the present disclosure should be understood in a broad sense. For example, the term may refer to a physical direct connection, or may refer to an indirect connection implemented through an electronic component, for example, a connection implemented through a resistor, an inductor, a capacitor, or another electronic component.

First, some basic concepts in embodiments of the present disclosure are explained and described.

An LED is made of compounds containing gallium (Ga), arsenic (As), phosphorus (P), nitrogen (N), and the like. Based on a principle that visible light can be radiated when electrons and holes are compounded, the LED is manufactured. An LED of gallium arsenide is configured to emit red light, an LED of gallium phosphide is configured to emit green light, an LED of silicon carbide is configured to emit yellow light, and an LED of gallium nitride is configured to emit blue light. Light-emitting diodes were first used for indicative lighting of instruments and meters, then extended to traffic lights, and then extended to landscape lighting, car lighting, mobile phone keyboard, and backlight. Later, a new technology of a micro LED (MLED) is developed, which greatly reduces a size of an original LED, and arranges micro LEDs that can independently emit red light, blue light, and green light into an array, to form a display array and apply the display array to the field of display technologies. The micro LED has a self-luminescence display characteristic. Compared with a self-luminescence display organic LED (OLED), the micro LED has higher efficiency, a longer service life, and a more stable material less susceptible to environmental impact.

Like a common diode, the LED includes a PN junction and has unidirectional conductivity. A core part of the LED is a wafer including a P-type semiconductor and an N-type semiconductor. There is a transition layer between the P-type semiconductor and the N-type semiconductor, which is referred to as a PN junction. In PN junctions of some semiconductor materials, extra energy is released in a form of light when injected minority carriers and majority carriers are compounded, so that electric energy is directly converted into light energy. When a reverse voltage is applied to the PN junction, it is difficult to inject the minority carriers, and therefore no light is emitted. When a forward voltage is applied to the LED, holes injected from a P region to an N region and electrons injected from the N region to the P region are respectively compounded with electrons in the N region and holes in the P region in several microns near the PN junction of the LED, to generate spontaneous emission fluorescence. Energy statuses of electrons and holes in different semiconductor materials are different. When electrons and holes are compounded, released energy is different. More released energy indicates a shorter wavelength of emitted light. Commonly used is an LED that emits red, green, or yellow light. When the LED is in a forward working state (that is, a forward voltage is added to two ends), when a current flows from an anode of the LED to a cathode of the LED, a semiconductor crystal emits light of different colors from ultraviolet to infrared. Intensity of the light is related to the current.

Currently, a drive mode of the LED is current drive. Current drive means providing a constant drive current for the LED, in other words, a current value of the drive current is a fixed value, and then adjusting, by using a PWM method, a proportion of conduction time of a branch in which the LED is located. Drive time is time required for the LED to emit light normally by providing the drive current to the LED, and the drive time is affected by a load value, a value of the drive current, and the like. For LEDs of a same specification, drive time under a larger drive current is shorter than drive time under a smaller drive current. Each display has a fixed display refresh rate, resolution, and the like. Both the fixed display refresh rate and the resolution correspond to specified drive time. If a provided drive current is excessively small, drive time of a corresponding LED may exceed specified drive time. Consequently, a display function of a display is abnormal. This problem is particularly obvious in a display using the micro LED.

An implementation of current drive is: providing a constant reference current, generating a plurality of constant drive currents based on the constant reference current, and respectively outputting the plurality of constant drive currents to LEDs on a plurality of corresponding branches. Then, a proportion of conduction time of each branch is adjusted by using a pulse-width modulation method, to control whether an LED on the branch emits light and control light-emitting intensity of the LED on the branch. In this manner, when there are a large quantity of conducted branches, to ensure that the pulse-width modulation method can still respond quickly within specified drive time, a reference current with a large value needs to be provided. When no branch in the plurality of branches needs to be conducted, the constant reference current causes a waste of power consumption. Alternatively, when a small quantity of branches in the plurality of branches needs to be conducted, providing a reference current with a large value also causes a waste of power consumption.

Figure 2:
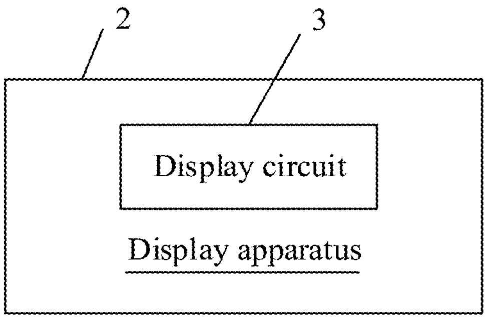
FIG. 2 is a diagram of a structure of a display apparatus according to an embodiment of the present disclosure.
Figure 3:
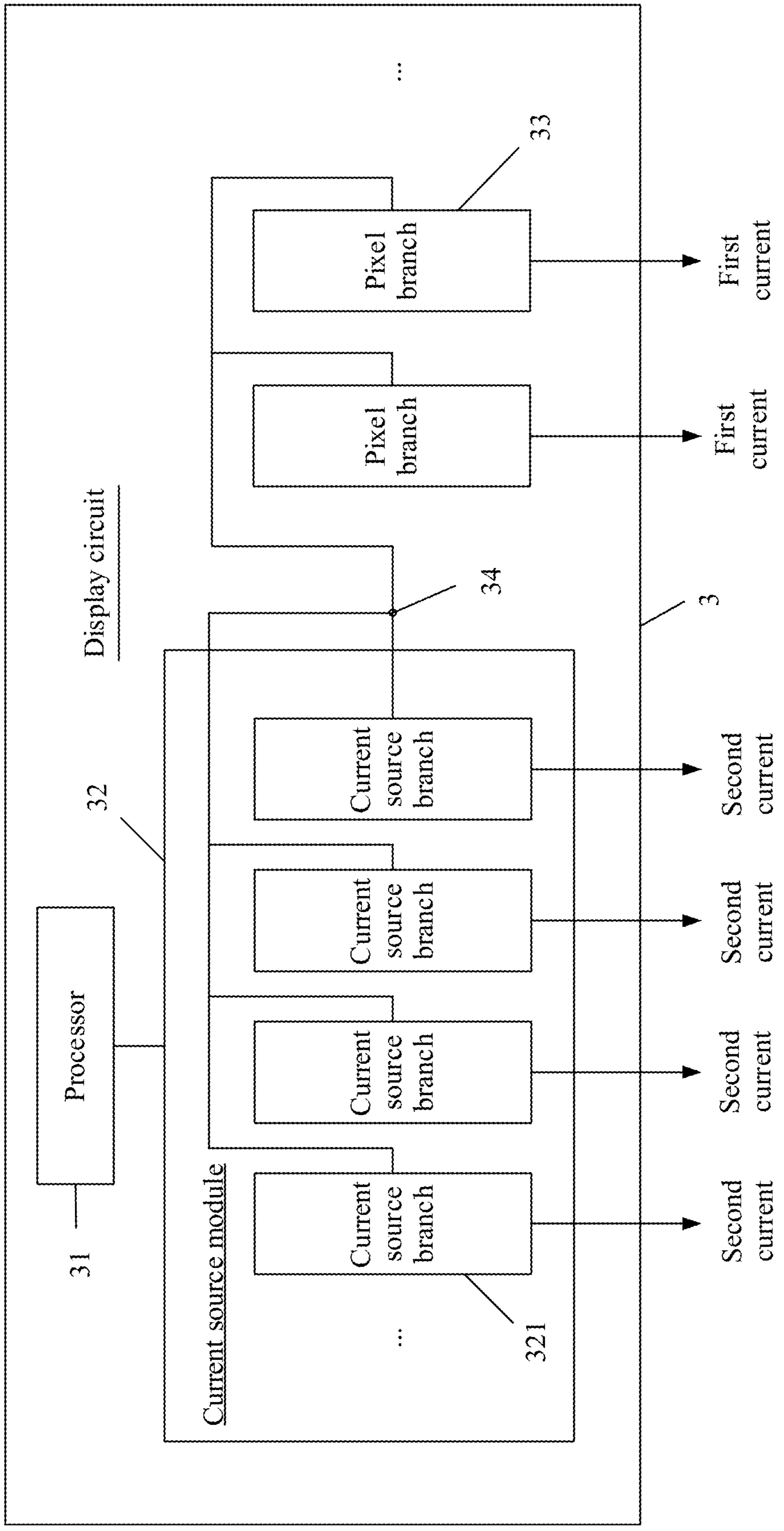
FIG. 3 is a diagram of a structure of a display circuit according to an embodiment of the present disclosure.
Figure 4:
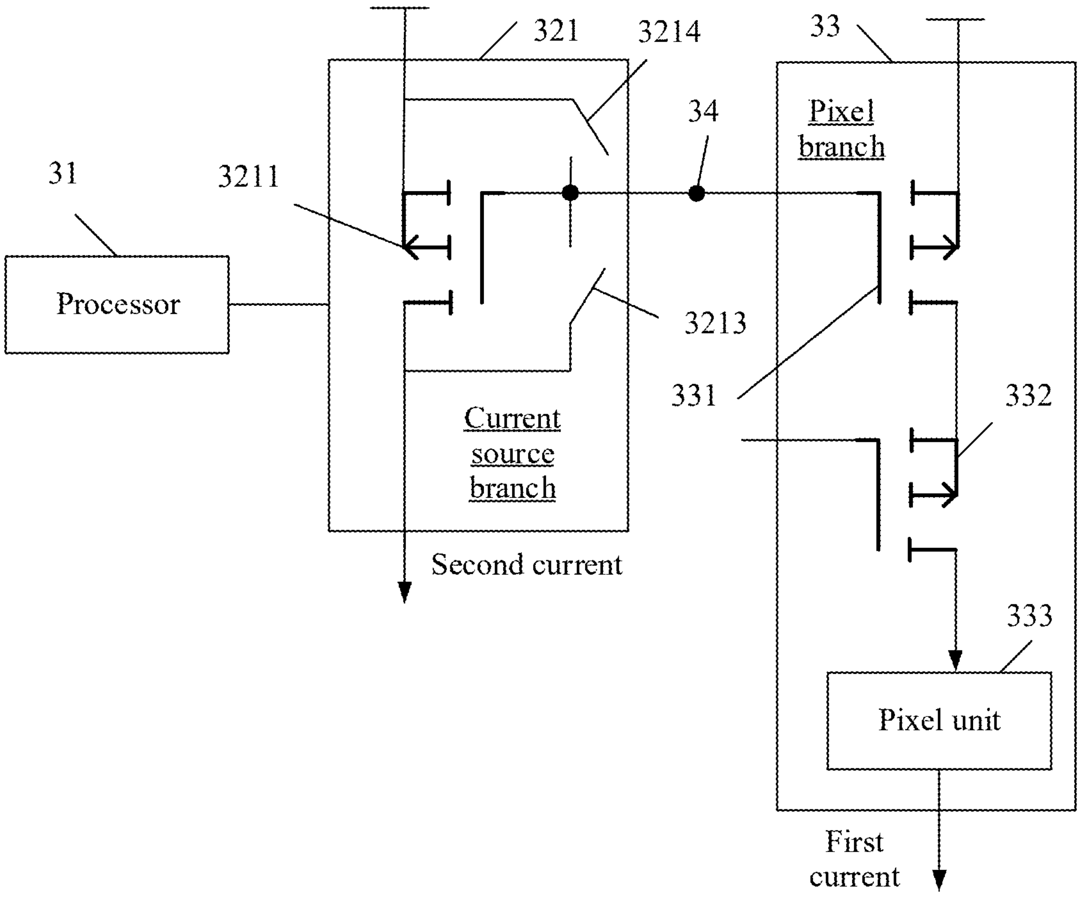
FIG. 4 is a diagram of structures of a current source branch and a pixel branch according to an embodiment of the present disclosure.

To reduce power consumption, an embodiment of the present disclosure provides an electronic device. As shown in FIG. 1, an electronic device 1 includes a display apparatus 2. The display apparatus 2 is configured to receive a data signal, and emit light based on the data signal, to display a corresponding image. As shown in FIG. 2, the display apparatus 2 includes a display circuit 3. As shown in FIG. 3, the display circuit 3 includes a processor 31, a current source module 32, and a plurality of pixel branches 33. The current source module 32 includes a plurality of current source branches 321. As shown in FIG. 4, each current source branch 321 includes a first transistor 3211. Each pixel branch 33 includes a pixel unit 333 configured to emit light, a second transistor 331, and a pulse width control switch transistor 332. The pixel unit 333, the second transistor 331, and the pulse width control switch transistor 332 are connected in series. Gates of the plurality of first transistors 3211 and gates of the plurality of second transistors 331 are coupled to a first coupling point 34 to form CM structures. Each current source branch 321 is used to output one second current. In the pixel branch 33, a first current flows through each pixel unit 333 to drive the pixel unit 333 to emit light. A total current value of all second currents output by the current source module 32 is used to determine current values of first currents. The processor 31 is coupled to the plurality of current source branches 321. The processor 31 is configured to control, through a control circuit, each of the plurality of current source branches 321 to be conducted or disconnected, to control whether each current source branch 321 outputs the second current, so as to adjust the total current value of the second currents output by the current source module 32.

In some possible implementations, the electronic device 1 may be a mobile phone, a desktop computer, a notebook computer, a tablet computer, a watch, an audio and video playback device, a virtual reality (VR) display device, an augmented reality (AR) display device, a wearable display device, or the like.

In embodiments of the present disclosure, each turned-on first transistor 3211 in the plurality of current source branches 321 and the second transistor 331 in the pixel branch 33 form a current mirror structure. Therefore, the total current value of the second currents output by the current source module 32 may be adjusted by controlling a quantity of conducted pixel branches 321, and the total current value of the second currents is used to determine the values of the first currents that flow through the pixel branches 33. The first current flowing through the pixel branch 33 is output to the pixel unit 333 as a drive current, to drive the pixel unit 333 to emit light. Generally, the second current, as a reference current for determining a value of the first current, always exists. When the pixel unit 333 does not need to emit light, the first current does not need to flow through the pixel branch 33, but the current source module 32 still outputs the second current used as the reference current, which causes a waste of power consumption. In addition, when a plurality of pixel units 333 are disposed, a larger quantity of pixel units 333 indicates a larger quantity of corresponding pixel branches 33. In this case, a first current with a larger current is required, so that the pixel unit 333 can be quickly responded for drive. To ensure that the first currents enable all pixel units 333 in the plurality of pixel branches 33 to still be quickly responded within specified drive time in an application scenario in which all the pixel units 333 in the plurality of pixel branches 33 emit light simultaneously, the first currents need to be correspondingly set to be as large as possible, and the total current value of the second currents output by the current source module 32 also needs to be correspondingly set to be as large as possible. However, in this case, if only a part of pixel units 333 in the plurality of pixel branches 33 need to emit light, although the first currents and the second currents that are set to large values can ensure that the part of pixel units 333 are quickly responded within the specified drive time, some power consumption is still wasted. To avoid the foregoing waste of power consumption, as shown in FIG. 3 and FIG. 4, in embodiments of the present disclosure, the plurality of current source branches 321 are disposed in the current source module 32, and each current source branch 321 is used to output one second current. Whether each of the plurality of current source branches 321 outputs the second current is adjusted through the control circuit, to dynamically adjust the total current value of the second currents output by the current source module 32. Further, the current values of the first currents are adjusted based on the total current value of the second currents.

In some possible implementations, the processor 31 adjusts, based on light-emitting state information, whether each of the plurality of current source branches 321 is conducted. The light-emitting state information includes at least one of light-emitting intensity information of the plurality of pixel units 333 and light-emitting quantity information of the plurality of pixel units 333.

For example, when the light-emitting state information includes the light-emitting intensity information, the current value of the first current flowing through the pixel unit 333 and a device parameter of the pixel unit 333 determine maximum light-emitting intensity of the pixel unit 333. The processor 31 controls, based on the maximum light-emitting intensity required by the pixel unit 333, the total current value of the second currents output by the current source module 32, to control the current values of the corresponding first currents provided by the pixel branches 33. In this case, whether each of the plurality of current source branches 321 outputs the second current is controlled, to adjust the total current value of the second currents output by the current source module 32, so as to adjust the current value of the first current based on the second current.

For example, when the light-emitting state information includes the light-emitting quantity information, in embodiments of the present disclosure, the value of the first current is determined based on the second current. When there are more pixel units 333 that need to emit light, there are also more pixel branches 33 that provide first currents. When a quantity of pixel units 333 is large, the total current value of the second currents output by the current source module 32 is larger, and the first current flowing through the pixel branch 33 rises more quickly to a stable current value sufficient to drive the pixel units 333 to emit light, that is, drive time is shorter. When a quantity of pixel units 333 that needs to emit light is large, to ensure that each pixel unit 333 that emits light can emit light normally within the specified drive time, the processor 31 needs to control more current source branches 321 to output more second currents, to increase the total current value of the output second currents. When a quantity of pixel units 333 that needs to emit light is small, on the basis of ensuring that each pixel unit 333 that emits light can emit light normally within the specified drive time, the processor 31 needs to perform control to reduce a quantity of current source branches 321 that outputs the second currents, to reduce the total current value of the output second currents as much as possible.

In some possible implementations, as shown in FIG. 4, one current source branch 321 includes a first transistor 3211 and a control circuit; the control circuit includes a first switch 3213 and a second switch 3214; and one pixel branch 33 includes a second transistor 331. The first switch 3213 is coupled between a first electrode of the first transistor 3211 and a gate of the first transistor 3211, the second switch 3214 is coupled between a second electrode of the first transistor 3211 and the gate of the first transistor 3211, and the gate of the first transistor 3211 and a gate of the second transistor 331 are coupled to a first coupling point 34. The processor 31 is specifically configured to: control the first switch 3213 to be turned on and control the second switch 3214 to be turned off, to control the corresponding first transistor 3211 to be turned on; or control the first switch 3213 to be turned off and control the second switch 3214 to be turned on, to control the corresponding first transistor 3211 to be turned off.

Figure 5:
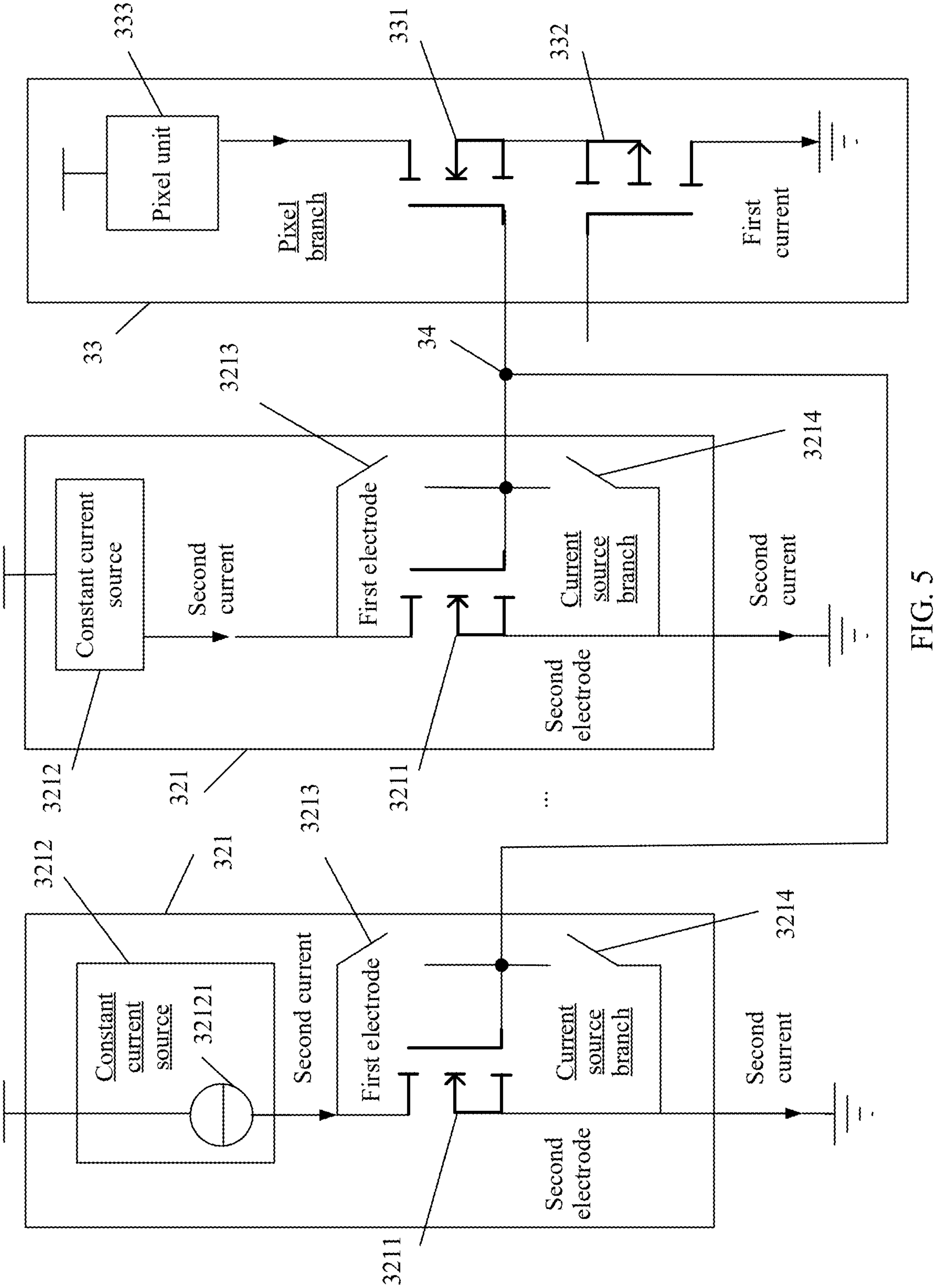
FIG. 5 is a diagram of structures of another current source branch and another pixel branch according to an embodiment of the present disclosure.

For example, as shown in FIG. 5, the first transistor 3211 and the second transistor 331 may be NMOS transistors.

Figure 6:
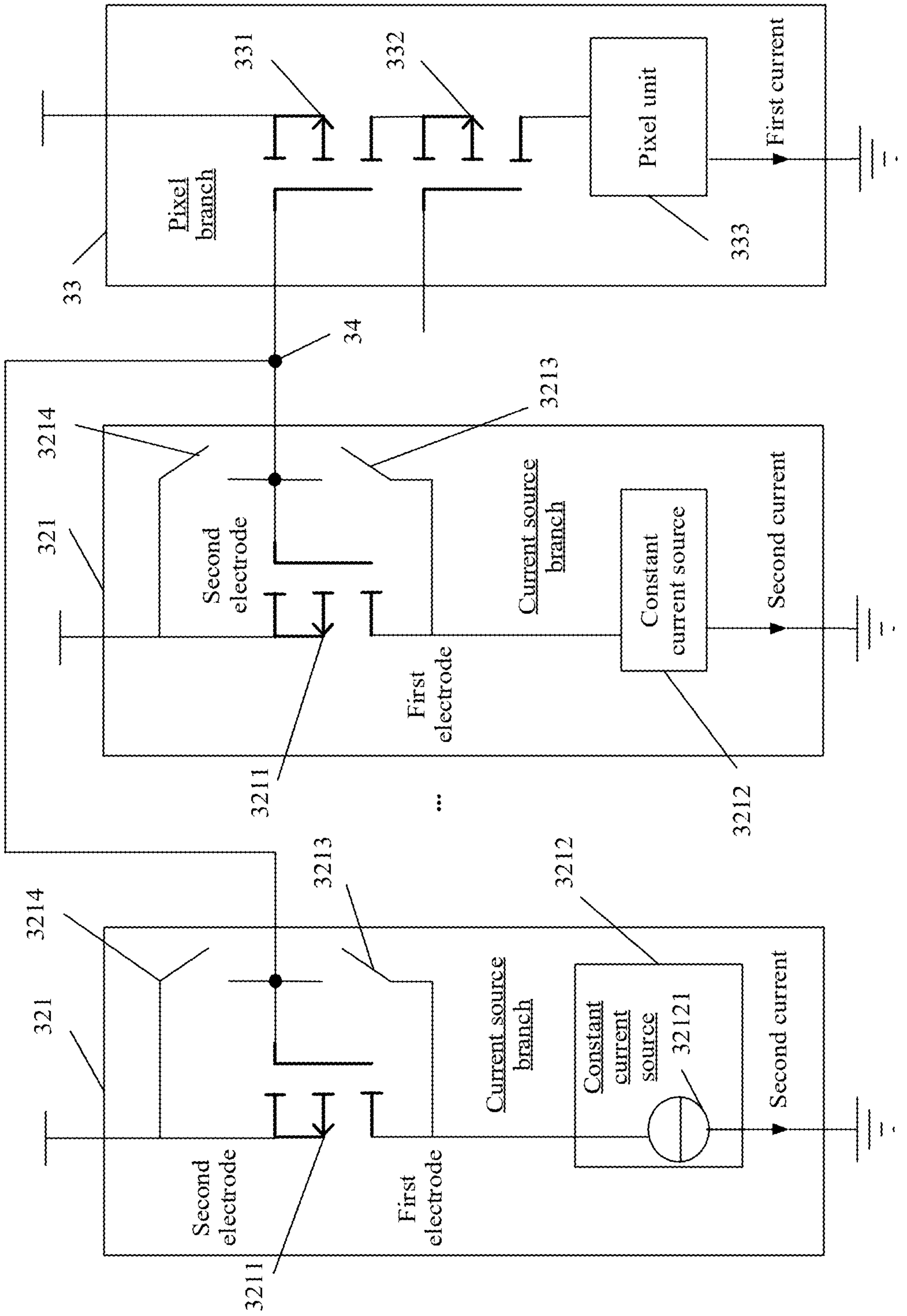
FIG. 6 is a diagram of structures of another current source branch and another pixel branch according to an embodiment of the present disclosure.

For example, as shown in FIG. 6, the first transistor 3211 and the second transistor 331 may be P-type metal-oxide-semiconductor (PMOS) transistors.

In embodiments of the present disclosure, when the gate of the first transistor 3211 is coupled to the gate of the second transistor 331, a voltage of the gate of the first transistor 3211 is equal to a voltage of the gate of the second transistor 331. When the second electrode of the first transistor 3211 is coupled to the gate of the first transistor 3211, the first transistor 3211 is in a turn-off state. In this case, the first electrode of the first transistor 3211 does not output the second current, and the total current value of the second currents output by the plurality of first transistors 3211 is decreased. When a first electrode of a first transistor 3211 is coupled to a gate of the first transistor 3211, the first transistor 3211 is turned on, the first electrode and a second electrode of the first transistor 3211 are conducted, and a second current flows through the first transistor 3211, and a CM structure is formed between the first transistor 3211 and a second transistor 331. For the plurality of current source branches 321, all the turned-on first transistors 3211 in the plurality of current source branches 321 and the second transistors 331 form the current mirror structures, and a sum of the plurality of second currents output by all the turned-on first transistors 3211 is used as a reference current. There is a proportional relationship between a first current flowing through the turned-on second transistor 331 and the total current of all the second currents. Based on a characteristic of the current mirror, the proportional relationship is determined by a proportional relationship between a first ratio and a second ratio. The first ratio is a ratio $W_1/L_1$ of a channel width $W_1$ of the first transistor 3211 to a channel length $L_1$, and the second ratio is a ratio $W_2/L_2$ of a channel width $W_2$ of the second transistor 331 to a channel length $L_2$.

In some possible implementations, as shown in FIG. 5 and FIG. 6, the current source branch 321 further includes a constant current source 3212. The constant current source 3212 is configured to provide a second current to the first transistor 3211.

For example, the constant current source 3212 includes a current source 32121.

In embodiments of the present disclosure, the current source 32121 provides a constant second current as a reference current.

Figure 7:
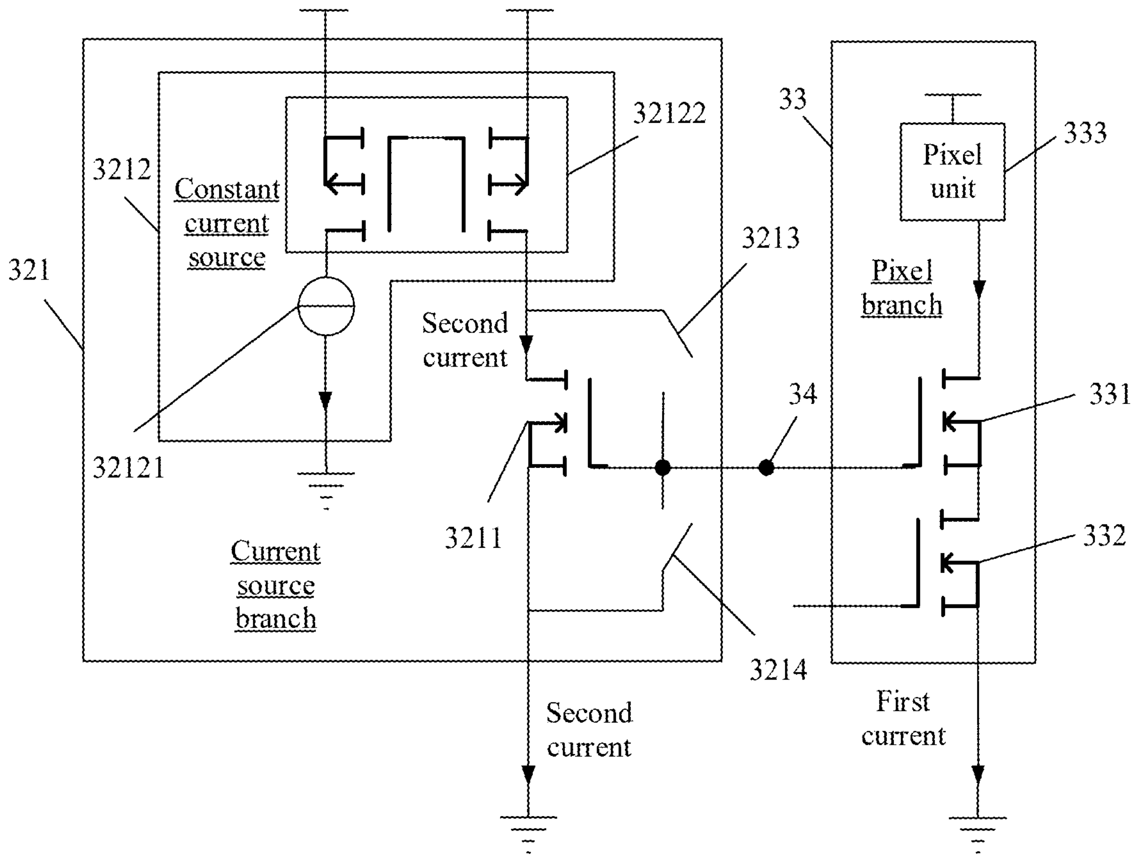
FIG. 7 is a diagram of structures of another current source branch and another pixel branch according to an embodiment of the present disclosure.
Figure 8:
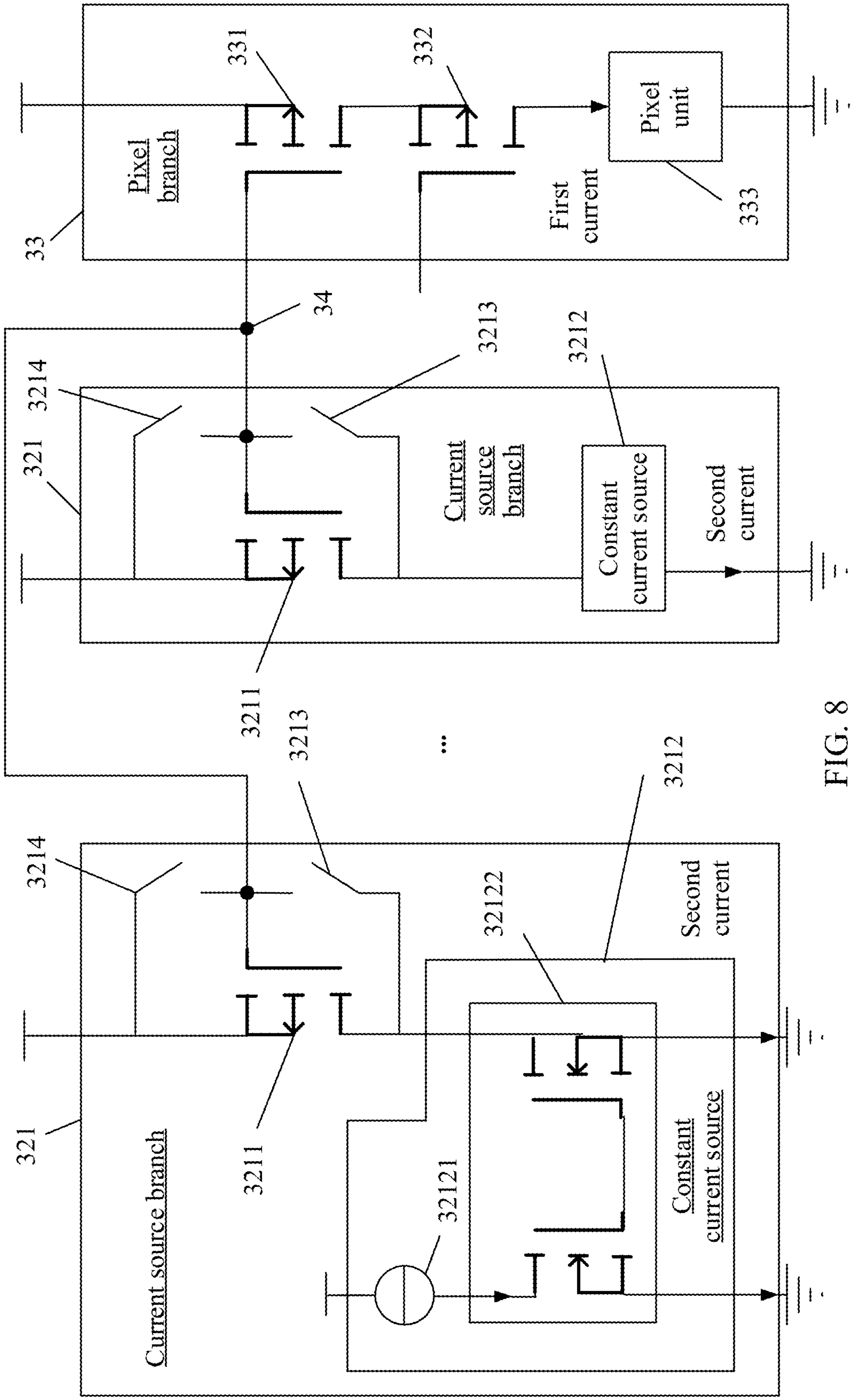
FIG. 8 is a diagram of structures of another current source branch and another pixel branch according to an embodiment of the present disclosure.

For example, as shown in FIG. 7 and FIG. 8, the constant current source 3212 further includes a reference current mirror unit 32122.

In embodiments of the present disclosure, a precision error may exist between the first transistor 3211 and the second transistor 331 due to a manufacturing process or the like. In this case, a constant current is provided to a reference side of the reference current mirror unit 32122 through the current source 32121, a constant reference current is output from an output side of the reference current mirror unit 32122, the constant reference current is provided as a second current to the first transistor 3211, and the second current is output from the first transistor 3211, to improve precision of the second current and a first current. Similarly, based on a precision requirement, an additional reference current mirror unit 32122 may be further added on the reference side or the output side of the reference current mirror unit 32122 for further calibration. FIG. 7 and FIG. 8 respectively correspond to specific solution applications of the constant current source 3212 in the structures shown in FIG. 5 and FIG. 6.

Figure 9:
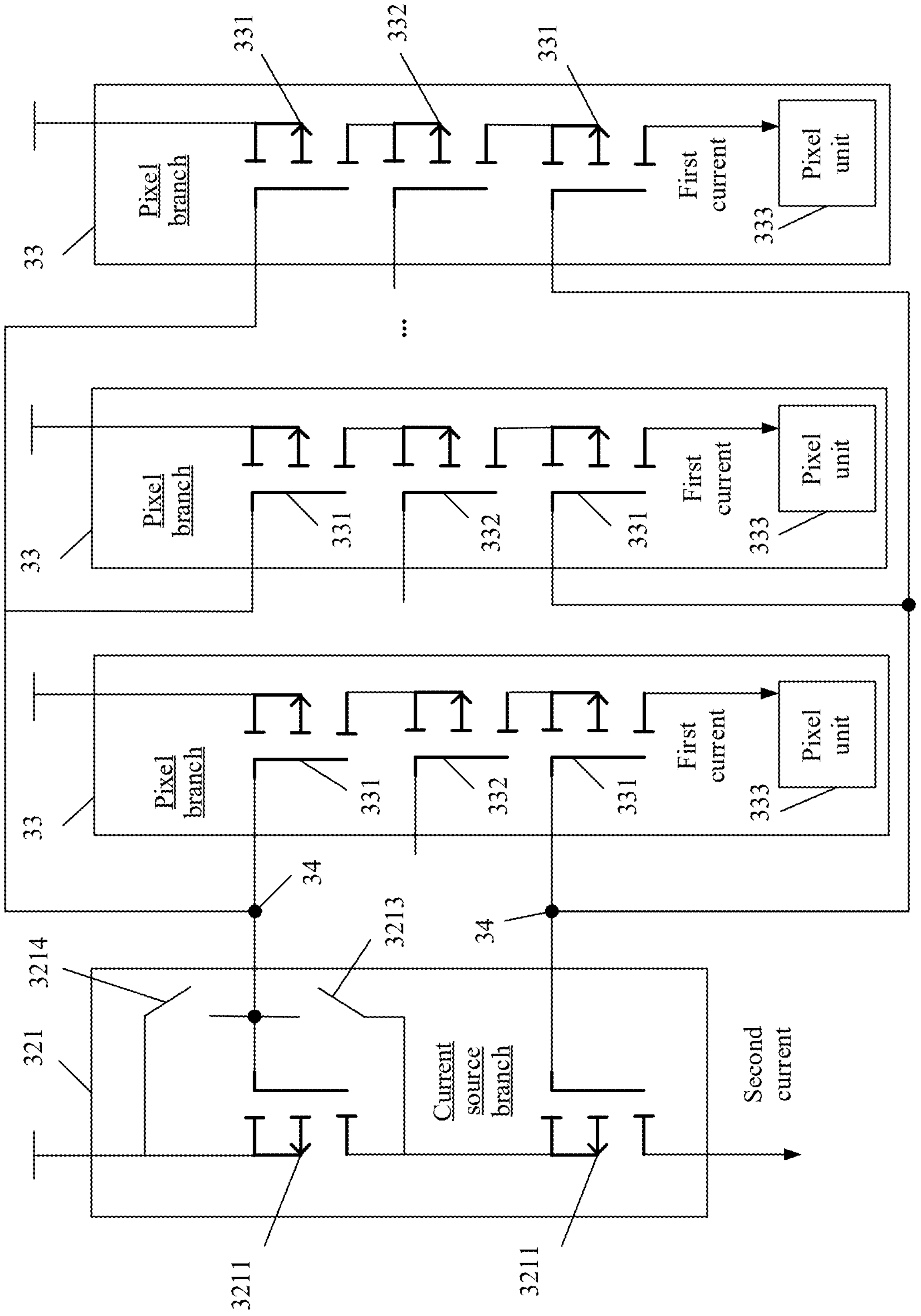
FIG. 9 is a diagram of structures of another current source branch and another pixel branch according to an embodiment of the present disclosure.

In some possible implementations, as shown in FIG. 9, one current source branch 321 includes a plurality of first transistors 3211 connected in series, one pixel branch 33 includes second transistors 331 connected in series whose quantity corresponds to a quantity of first transistors 3211, a gate of one first transistor 3211 is correspondingly coupled to a gate of one second transistor 331, to form one current mirror structure, and ratios of first ratios to second ratios are equal for a plurality of current mirrors. The first ratio is a ratio of a channel width of the first transistor 3211 in the current mirror to a channel length, and the second ratio is a ratio of a channel width of the second transistor 331 in the current mirror to a channel length.

Figure 10:
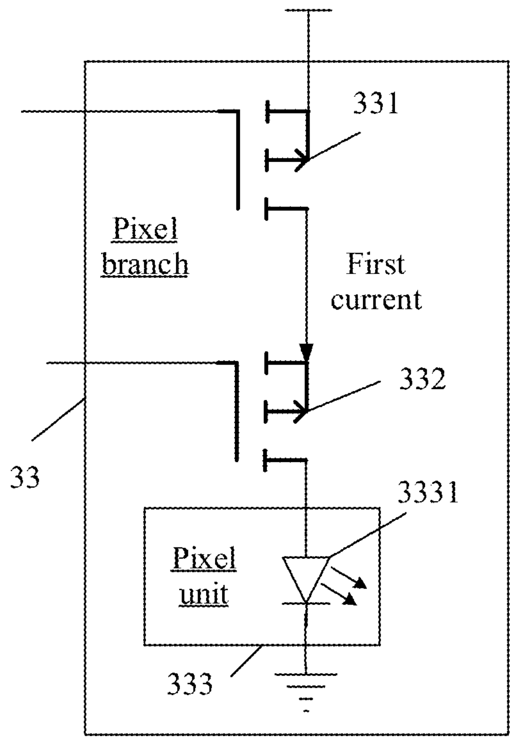
FIG. 10 is a diagram of a structure of a pixel branch according to an embodiment of the present disclosure.

In some possible implementations, as shown in FIG. 10, the pixel unit 333 includes at least one LED 3331.

For example, the LED 3331 may be a common LED, or may be an MLED.

Figure 11:
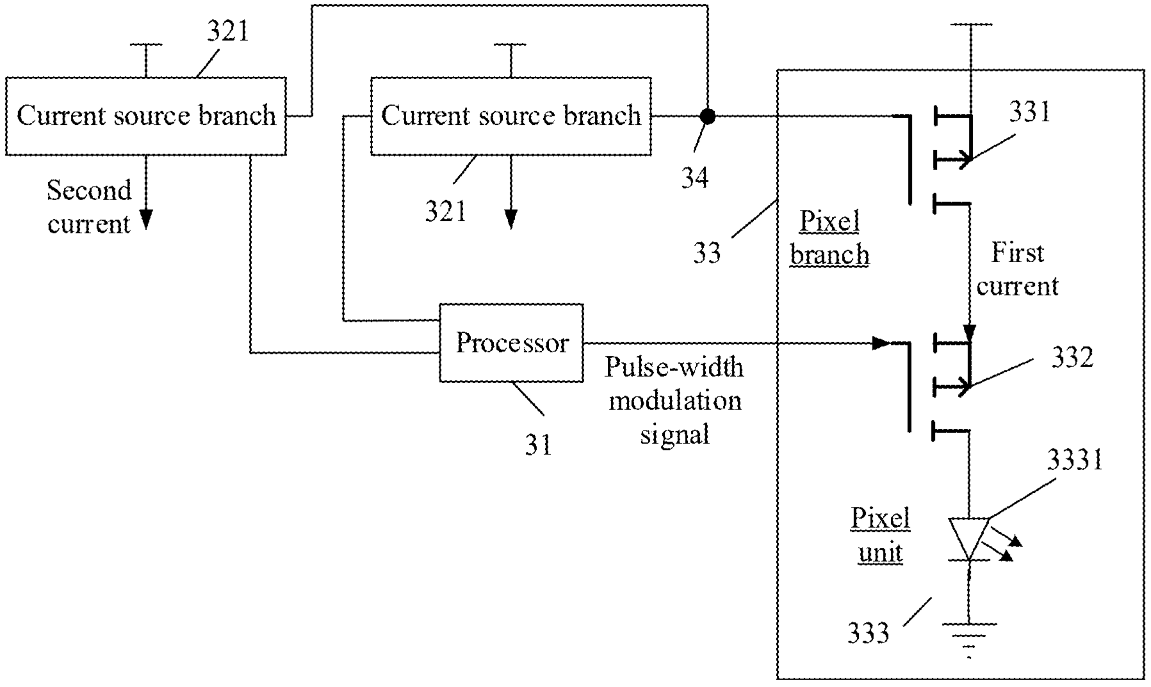
FIG. 11 is a diagram of a structure of another pixel branch according to an embodiment of the present disclosure.

In some possible implementations, as shown in FIG. 11, the pixel branch 33 further includes a pulse width control switch transistor 332. The processor 31 is configured to output a pulse-width modulation signal to the pulse width control switch transistor 332. The pulse-width modulation signal is used to turn on the pulse width control switch transistor 332, to conduct a path in which the LED 3331 is located, so as to control the LED 3331 to emit light. Alternatively, the pulse-width modulation signal is used to turn off the pulse width control switch transistor 332, to turn off a path in which the LED 3331 is located, so as to control the LED 3331 not to emit light. In addition, different duty cycles of the pulse-width modulation signal are used to control light-emitting intensity of the corresponding LED 3331.

For example, the pulse width control switch transistor 332 is an NMOS transistor. When the pulse-width modulation signal is a high-level signal, the pulse width control switch transistor 332 is turned on, and the LED 3331 emits light. In addition, a duty cycle (that is, a ratio of an effective pulse width) of the pulse-width modulation signal modulated as the high-level signal may adjust light-emitting intensity of the LED 3331. When the pulse-width modulation signal is a low-level signal, the pulse width control switch transistor 332 is not turned on, and the LED 3331 does not emit light.

For example, the pulse width control switch transistor 332 may be connected in series at any position on a circuit branch including the pixel branch 33.

For example, the pulse width control switch transistor 332 may be a triode, or may be a transistor, or may be another switch device that implements control via a high or low level.

In embodiments of the present disclosure, a function of the pulse width control switch transistor 332 is to control the circuit branch including the pixel branch 33 to be conducted and control a conduction frequency to adjust light-emitting intensity. Therefore, this function can be implemented provided that the pulse width control switch transistor 332 is disposed on the circuit branch and can be used to control conduction and disconnection of the circuit branch.

For example, the pulse width control switch transistor 332 is disposed between the LED 3331 and the second transistor 331.

Optionally, a withstand voltage of the second transistor 331 may be equal to a withstand voltage of the pulse width control switch transistor 332, or may be greater than or less than a withstand voltage of the pulse width control switch transistor 332.

Figure 12:
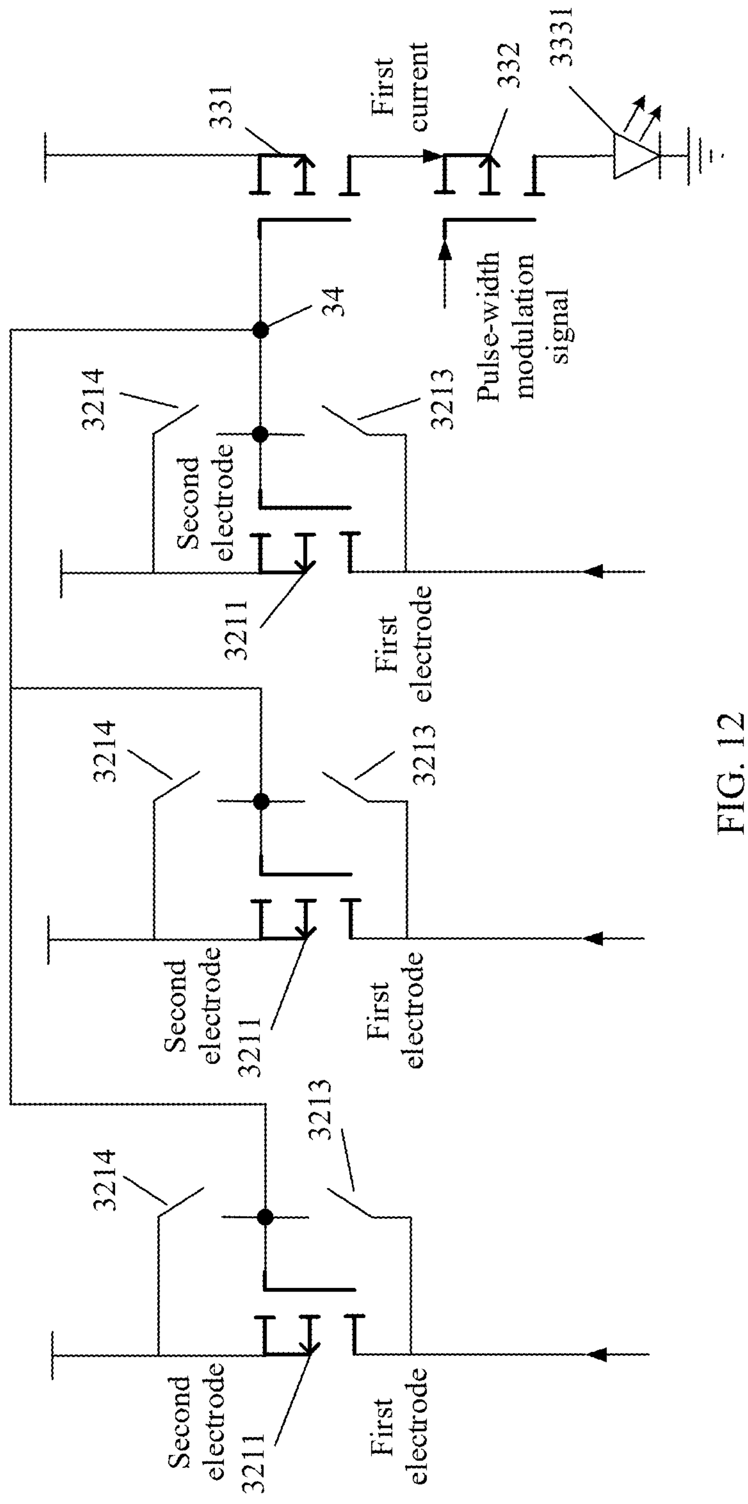
FIG. 12 is a diagram of a structure of another display circuit according to an embodiment of the present disclosure.

For example, as shown in FIG. 12, that 60 pixel branches 33 are disposed is used as an example. Each pixel branch 33 includes a second transistor 331, an LED 3331, and a pulse width control switch transistor 332. Correspondingly, three current source branches 321 may be disposed, and each current source branch 321 includes a first transistor 3211, a first switch 3213, and a second switch 3214. Each LED 3331 is correspondingly coupled to a second transistor 331 in one pixel branch 33. A ratio $W_1/L_1$ of a channel width $W_1$ of the first transistor 3211 corresponding to each of the three current source branches 321 to a channel length $L_1$ is adjusted, so that when a current value of a first current is 1ref, current values of second currents output by the three current source branches 321 are 1ref, 21ref, and 31ref, respectively. When no LED 3331 in 60 LEDs 3331 needs to emit light, the first switches 3213 corresponding to the three first transistors 3211 are controlled to be turned off, and the second switches 3214 are turned on, so that the three first transistors 3211 are all turned off, and in this case, no second current is output. When 1 to 10 LEDs 3331 need to emit light, a first transistor 3211 corresponding to a second current whose current value is 1ref is controlled to be turned on, and the other two first transistors 3211 are turned off, so that a total current value of the output second currents is 1ref, which meets a light-emitting requirement of the 1 to 10 LEDs 3331. Similarly, when 11 to 20, 21 to 30, 31 to 40, 41 to 50, and 51 to 60 LEDs 3331 need to emit light, turn-on and turn-off of the three first transistors 3211 may be correspondingly controlled, to adjust the total current value of the second currents, so as to meet a light-emitting requirement of the corresponding quantity of LEDs 3331.

In embodiments of the present disclosure, a withstand voltage is an inherent characteristic of a transistor, and is related to a ratio of an epitaxial layer resistance to a total turn-on resistance in a transistor structure. When the ratio of the epitaxial layer resistance to the total turn-on resistance is small, the withstand voltage is also small. For a transistor with a small withstand voltage, a small current may be used to drive the transistor. When the ratio of the epitaxial layer resistance to the total turn-on resistance is large, the withstand voltage is also large. For a transistor with a large withstand voltage, a large current is required to drive the transistor. The withstand voltage is used as a device parameter of the transistor, and is used to describe working performance of the transistor. The withstand voltage may be used to express drive performance, a capability of withstanding a voltage difference, and the like of the transistor. In actual application, a voltage at two ends of the LED 3331 may be lower than an actual preset voltage due to a process deviation, a leakage current, and the like, and a voltage difference in a circuit branch including one pixel branch 33 and one pixel unit 333 has been arranged based on the preset voltage. When the voltage at the two ends of the LED 3331 is lower than the actual preset voltage, for example, the preset voltage difference between the two ends of the LED 3331 is 2.5 V, but due to the process deviation and the leakage current problem, the voltage difference between the two ends of the LED 3331 is actually only 1.5 V or lower than 1.5 V. In this case, a second transistor 331 and a pulse width control switch transistor 332 that are located on the circuit branch need to bear a larger voltage difference. In this case, if the second transistor 331 and the pulse width control switch transistor 332 have low withstand voltages, the second transistor 331 and the pulse width control switch transistor 332 may be damaged because they cannot withstand the larger voltage difference. Consequently, a stability problem is caused. A solution is to increase the withstand voltages of the second transistor 331 and the pulse width control switch transistor 332. This requires a larger second current and a larger first current to enable the circuit branch to be quickly conducted and implement a quick response of the LED 3331 within the specified drive time. This manner undoubtedly greatly increases power consumption of a system. In this case, the withstand voltage of the pulse width control switch transistor 332 may be appropriately increased. Stability of the circuit is improved through the pulse width control switch transistor 332. In addition, the pulse width control switch transistor 332 may be disposed between the second transistor 331 and the LED 3331, and when the voltage difference between the two ends of the LED 3331 is lower than a preset condition, the pulse width control switch transistor 332 may play a good buffering role, to ensure stability of the circuit branch.

Figure 13:
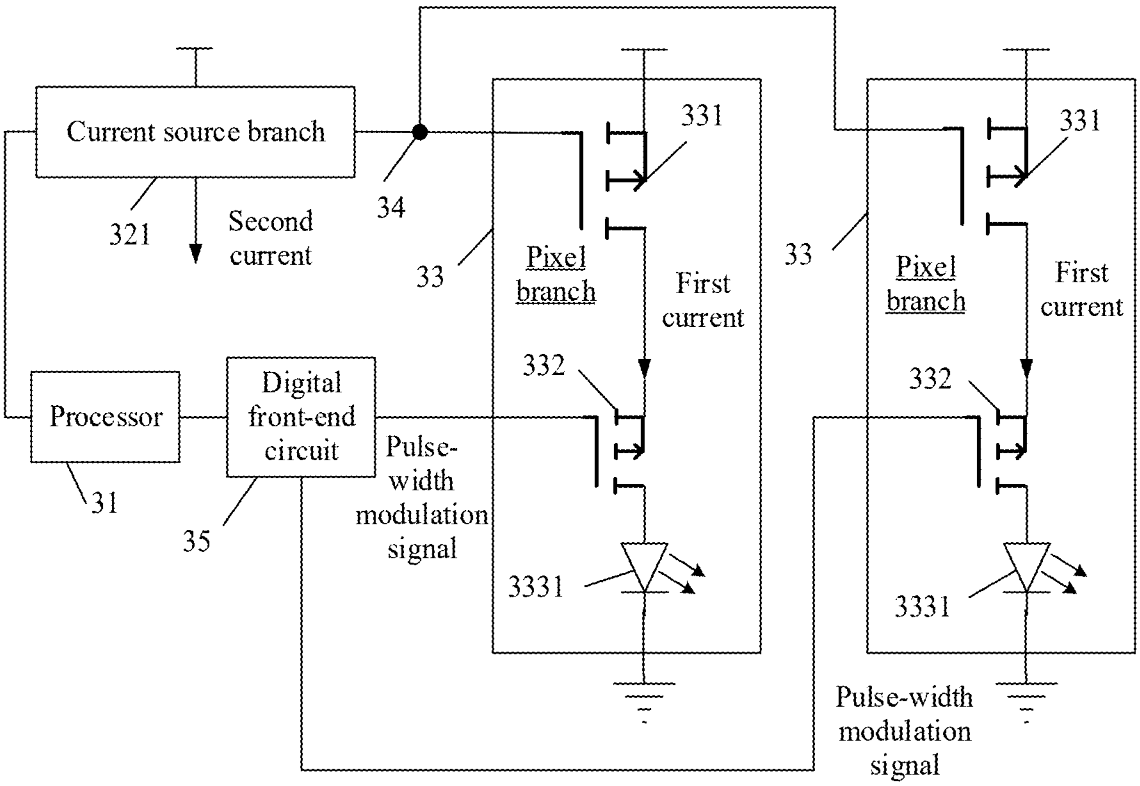
FIG. 13 is a diagram of a structure of another display circuit according to an embodiment of the present disclosure.

In some possible implementations, as shown in FIG. 13, the display circuit 3 further includes a digital front-end circuit 35, and the digital front-end circuit 35 is coupled to the processor 31. The processor 31 is configured to control, based on a digital signal, the digital front-end circuit 35 to output a pulse-width modulation signal to a corresponding pulse width control switch transistor 332.

Figure 14:
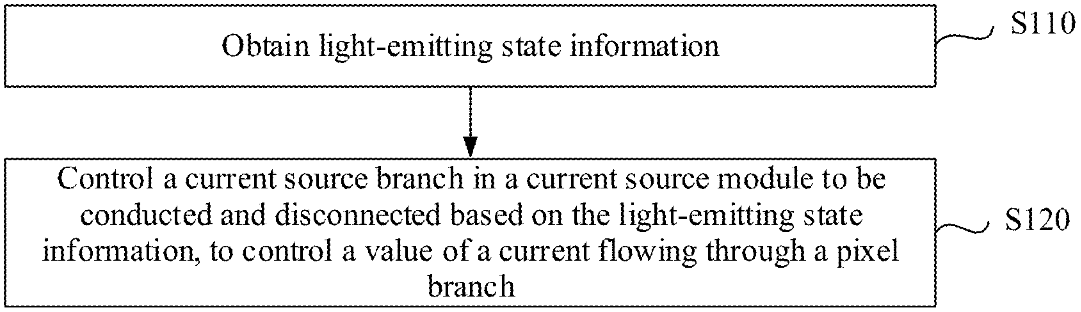
FIG. 14 is a schematic flowchart of a display method according to an embodiment of the present disclosure.

The display circuit 3 including the structures shown in FIG. 3, FIG. 4, FIG. 5, FIG. 6, FIG. 7, FIG. 8, FIG. 9, FIG. 10, FIG. 11, FIG. 12, and FIG. 13 may be configured to perform a display method that includes step S110 and step S120 shown in FIG. 14.

Step S110: Obtain light-emitting state information, where the light-emitting state information indicates at least one of light-emitting intensity information of a plurality of pixel units 333 and light-emitting quantity information of the plurality of pixel units 333.

Step S120: Control, based on the light-emitting state information, a current source branch in a current source module 32 to be conducted and disconnected, to control a value of a current flowing through a pixel branch 33.

In embodiments of the present disclosure, after a processor 31 receives a light-emitting state signal, if the light-emitting state signal indicates light-emitting intensity that requires the pixel unit 333 to specifically emit light, the current source module 32 is controlled, based on a value of a first current required by the light-emitting intensity, to output second currents whose total current value is in a corresponding proportion to the current value of the first current. If the light-emitting state signal indicates a specific light-emitting quantity of pixel units 333 that needs to emit light, a quantity of second currents that enables, under the specific light-emitting quantity, the pixel unit 333 to quickly respond within drive time for light emitting is provided based on the specific light-emitting quantity.

In some possible implementations, as shown in FIG. 4, one current source branch 321 includes a first transistor 3211 and a control circuit; the control circuit includes a first switch 3213 and a second switch 3214; and one pixel branch 33 includes a second transistor 331. The first switch 3213 is coupled between a first electrode of the first transistor 3211 and a gate of the first transistor 3211, the second switch 3214 is coupled between a second electrode of the first transistor 3211 and the gate of the first transistor 3211, and the gate of the first transistor 3211 and a gate of the second transistor 331 are coupled to a first coupling point 34. The processor 31 is specifically configured to: control the first switch 3213 to be turned on and control the second switch 3214 to be turned off, to control the corresponding first transistor 3211 to be turned on; or control the first switch 3213 to be turned off and control the second switch 3214 to be turned on, to control the corresponding first transistor 3211 to be turned off.

For example, as shown in FIG. 5, the first transistor 3211 and the second transistor 331 may be NMOS transistors. In this case, the first electrode of the first transistor 3211 is a drain, and the second electrode of the first transistor 3211 is a source. A first electrode of the second transistor 331 is a drain and is coupled to the pixel unit 333. The first electrode of the first transistor 3211 is configured to input a second current. When the first switch 3213 is turned on and the second switch 3214 is turned off such that the first electrode of the first transistor 3211 is coupled to the gate (that is, when the drain of the first transistor 3211 is coupled to the gate), because the first transistor 3211 and the second transistor 331 are NMOS transistors, the gate is turned on when a high level is applied. In this case, the second electrode (that is, the source) of the first transistor 3211 is grounded or at a low level. The first electrode (that is, the drain) of the first transistor 3211 is connected to the high level, so that the high level at the first electrode of the first transistor 3211 enables the first transistor 3211 and the second transistor 331 to be turned on. In this way, the second current flows through between the second electrode and the first electrode of the first transistor 3211. Because the gates of the first transistor 3211 and the second transistor 331 are coupled, when the second current passes through the first transistor 3211, the second transistor 331 is also turned on and the first current flows through the second transistor 331. The second transistor 331 is turned on, so that the first current also flows through the pixel unit 333, and the first current drives the pixel unit 333 to emit light. Due to a structural characteristic of a current mirror, there is a proportional relationship between a current value of the second current and the current value of the first current. The proportional relationship is determined by a proportional relationship between a first ratio and a second ratio. The first ratio is a ratio $W_1/L_1$ of a channel width $W_1$ of the first transistor 3211 to a channel length $L_1$, and the second ratio is a ratio $W_2/L_2$ of a channel width $W_2$ of the second transistor 331 to a channel length $L_2$. When the second switch 3214 is turned on and the first switch 3213 is turned off such that the second electrode of the first transistor 3211 is coupled to the gate (that is, when the source of the first transistor 3211 is coupled to the gate), because the first transistor 3211 is an NMOS transistor, a gate-source voltage VGS of the first transistor 3211 is 0. In this case, the first transistor 3211 and the second transistor 331 do not form a current mirror structure, and the turned-off first transistor 3211 may be considered not coupled to the first coupling point 34.

For example, as shown in FIG. 6, the first transistor 3211 and the second transistor 331 may be PMOS transistors. In this case, the first electrode of the first transistor 3211 is a drain, and the second electrode of the first transistor 3211 is a source. A first electrode of the second transistor 331 is a drain and is coupled to the pixel unit 333. The first electrode of the first transistor 3211 is configured to output a second current. When the first switch 3213 is turned on and the second switch 3214 is turned off such that the first electrode of the first transistor 3211 is coupled to the gate (that is, when the drain of the first transistor 3211 is coupled to the gate), because the first transistor 3211 and the second transistor 331 are PMOS transistors and are turned on at a low level. In this case, the first electrode (that is, the drain) of the first transistor 3211 is grounded or connected to a low level. The second electrode (that is, the source) of the first transistor 3211 is connected to the high level, so that the low level at the first electrode of the first transistor 3211 enables the first transistor 3211 and the second transistor 331 to be turned on. In this way, the second current passes through the first electrode of the first transistor 3211 from the second electrode of the first transistor 3211, and is output from the first electrode of the first transistor 3211. Because the gates of the first transistor 3211 and the second transistor 331 are coupled, when the second current passes through the first transistor 3211, the second transistor 331 is also turned on and the first current flows through the second transistor 331. The second transistor 331 is turned on, so that the first current also flows through the pixel unit 333, and the first current drives the pixel unit 333 to emit light. Due to a structural characteristic of a current mirror, there is a proportional relationship between a current value of the second current and the current value of the first current. The proportional relationship is determined by a proportional relationship between a first ratio and a second ratio. The first ratio is a ratio $W_1/L_1$ of a channel width $W_1$ of the first transistor 3211 to a channel length $L_1$, and the second ratio is a ratio $W_2/L_2$ of a channel width $W_2$ of the second transistor 331 to a channel length $L_2$. When the first switch 3213 is turned off and the second switch 3214 is turned on such that the second electrode of the first transistor 3211 is coupled to the gate (that is, when the source of the first transistor 3211 is coupled to the gate), a gate-source voltage VGS of the first transistor 3211 is 0. In this case, the first transistor 3211 and the second transistor 331 do not form a current mirror structure, and the turned-off first transistor 3211 may be considered not coupled to the first coupling point 34.

For example, for each first transistor 3211, through the first switch 3213 and the second switch 3214, a gate of the first transistor 3211 is conducted with a first electrode of the first transistor 3211 or a gate of the first transistor 3211 is conducted with a second electrode of the first transistor 3211.

In embodiments of the present disclosure, a turn-on manner of one first transistor 3211 may be controlled via one digital signal. For example, when a value of the digital signal is 0, a first switch 3213 between a first electrode of the first transistor 3211 and a gate of the first transistor 3211 is turned on, and a second switch 3214 between a second electrode of the first transistor 3211 and the gate of the first transistor 3211 is turned off. On the contrary, when the value of the digital signal is 1, the first switch 3213 between the first electrode of the first transistor 3211 and the gate of the first transistor 3211 is turned off, and the second switch 3214 between the second electrode of the first transistor 3211 and the gate of the first transistor 3211 is turned on.

In some possible implementations, as shown in FIG. 5 and FIG. 6, the current source branch 321 further includes a constant current source 3212. The constant current source 3212 is configured to provide a second current to the first transistor 3211.

For example, the constant current source 3212 includes a current source 32121.

In embodiments of the present disclosure, a constant second current is generated via the current source branch 321.

For example, as shown in FIG. 7 and FIG. 8, the constant current source 3212 further includes a reference current mirror unit 32122.

As shown in FIG. 7, when the first transistor 3211 and the second transistor 331 are NMOS transistors shown in FIG. 5, the reference current mirror unit 32122 may include two PMOS transistors. The constant current source 3212 is coupled to a reference side of the reference current mirror unit 32122. When a PMOS transistor on the reference side of the reference current mirror unit 32122 is turned on and a constant current flows through the PMOS transistor, a reference current that is proportional to the constant current is also output from an output side of the reference current mirror unit 32122. A specific proportional relationship is a ratio of a channel width of each of the two PMOS transistors to a channel length. For example, if a ratio of a channel width of the transistor on the reference side to a channel length is A, and a ratio of a channel width of a transistor on the output side to a channel length is B, a proportional relationship between a current value of the constant current on the reference side and a current value of the reference current on the output side is A/B. Then, the reference current is input to the first transistor 3211 used as an NMOS transistor as a second current, and a first current flows through the second transistor 331 used as an NMOS transistor based on the second current, so that the pixel unit 333 emits light.

In embodiments of the present disclosure, a precision error may exist between the first transistor 3211 and the second transistor 331 due to a manufacturing process or the like. In this case, a constant current is provided to an input side of the reference current mirror unit 32122 through the constant current source 3212, a constant reference current is output from the output side of the reference current mirror unit 32122, and the constant reference current is provided as a second current to the first transistor 3211, to improve precision of a ratio between the total current value of the second currents and the current value of the first current. Similarly, based on a precision requirement, an additional reference current mirror unit 32122 may be further added on the reference side or the output side of the reference current mirror unit 32122 for further calibration. FIG. 7 and FIG. 8 correspond to specific extension of the constant current source 3212 in the structures shown in FIG. 5 and FIG. 6.

For example, the current source module 32 includes a plurality of current source branches 321, each current source branch 321 includes a first transistor 3211, and a turned-on first transistor 3211 and each second transistor 331 form a current mirror.

In some possible implementations, as shown in FIG. 9, one current source branch 321 includes a plurality of first transistors 3211 connected in series, one pixel branch 33 includes second transistors connected in series whose quantity corresponds to a quantity of first transistors 3211, a gate of one first transistor 3211 is correspondingly coupled to a gate of one second transistor 331, to form one current mirror structure, and ratios of first ratios to second ratios are equal for a plurality of current mirrors. The first ratio is a ratio of a channel width of the first transistor 3211 in the current mirror to a channel length, and the second ratio is a ratio of a channel width of the second transistor 331 in the current mirror to a channel length.

In embodiments of the present disclosure, as shown in FIG. 9, compared with a solution in which a plurality of first transistors 3211 and a plurality of second transistors 331 are disposed between each current source branch 321 and a pixel branch 33 to form a plurality of current mirrors, to determine a value of a first current based on a second current, precision of a proportional relationship between the second current and the first current is increased in this embodiment compared with a solution in which one current mirror is disposed between each current source branch 321 and a pixel branch 33.

In some possible implementations, as shown in FIG. 10, the pixel unit 333 includes at least one LED 3331.

In some possible implementations, as shown in FIG. 11, the pixel branch 33 further includes a pulse width control switch transistor 332. The processor 31 is configured to output a pulse-width modulation signal to the pulse width control switch transistor 332. The pulse-width modulation signal is used to turn on the pulse width control switch transistor 332, to conduct a path in which the LED 3331 is located, so that the LED 3331 emits light. In addition, different duty cycles of the pulse-width modulation signal are used to control light-emitting intensity of the corresponding LED 3331.

Figure 15:
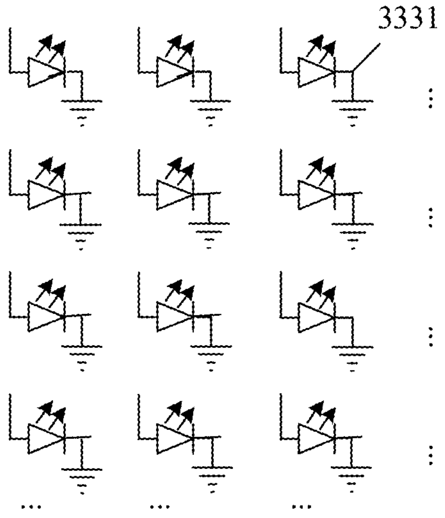
FIG. 15 is a diagram of an LED matrix according to an embodiment of the present disclosure.

For example, as shown in FIG. 15, LEDs 3331 in the plurality of pixel units 333 form an LED matrix. The LEDs 3331 in the plurality of pixel units 333 may be in a same row or a same column in the LED matrix, or may be located in any different row and/or different column in the LED matrix.

In embodiments of the present disclosure, the current value of the first current and a device parameter of the LED 3331 determine maximum light-emitting intensity of the LED 3331 in the pixel unit 333. Whether the LED 3331 emits light is determined by the pulse-width modulation signal. When no pulse-width modulation signal is output to the pulse width control switch transistor 332 or a low-level signal (that is, a pulse-width modulation signal whose duty cycle is 0) is output, the pulse width control switch transistor 332 is turned off, so that the pixel unit 333 does not emit light. When a pulse-width modulation signal whose duty cycle is greater than 0 is output to the pulse width control switch transistor 332, the pulse width control switch transistor 332 is turned on. A value of the duty cycle represents a proportion of a high level in the pulse-width modulation signal. A higher duty cycle means a higher turn-on frequency of the pulse width control switch transistor 332 in a unit time, and therefore, the light-emitting intensity of the LED 3331 is closer to the maximum light-emitting intensity of the LED 3331. Therefore, the light-emitting intensity of the LED 3331 may also be adjusted by adjusting the duty cycle of the pulse-width modulation signal.

Figure 16:
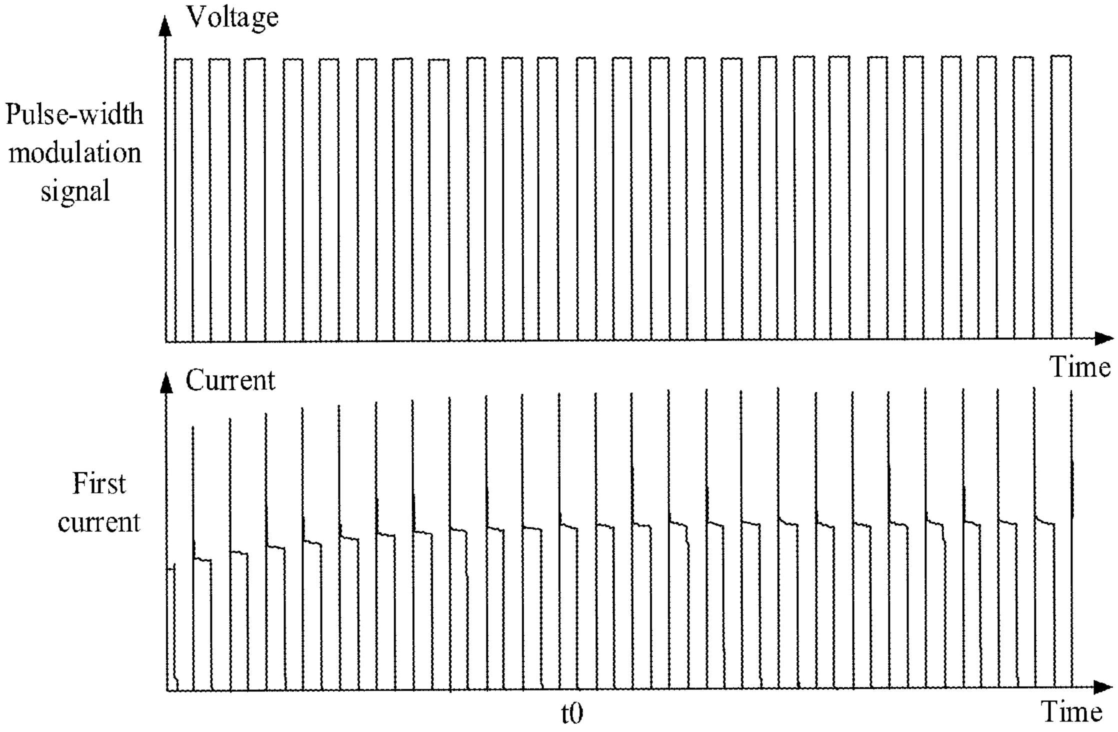
FIG. 16 shows time sequence diagrams of a pulse-width modulation signal and a first current when a ratio of a sum of second currents to a sum of first currents is 1:100 according to an embodiment of the present disclosure.
Figure 17:
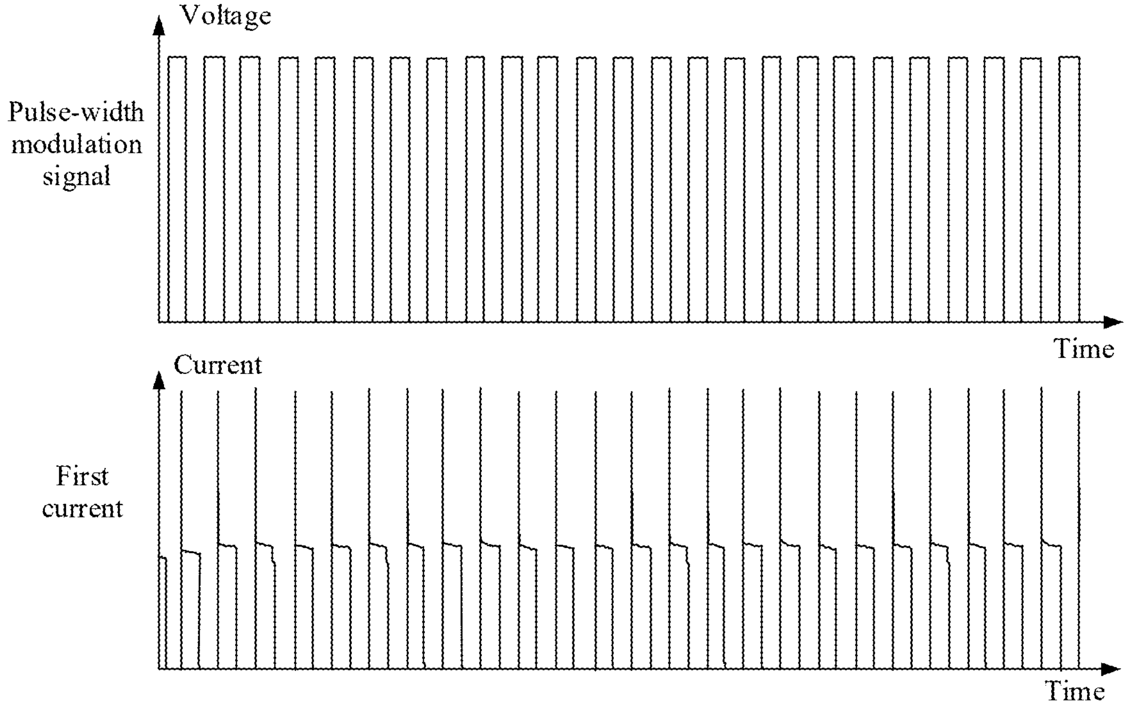
FIG. 17 shows time sequence diagrams of a pulse-width modulation signal and a first current when a ratio of a sum of second currents to a sum of first currents is 10:100 according to an embodiment of the present disclosure.

For example, as shown in FIG. 16 and FIG. 17, FIG. 16 shows time sequence diagrams of a pulse-width modulation signal and a current signal on a pixel unit 333 when a ratio of a sum of all second currents to a sum of all first currents is 1:100. It can be learned that, it is assumed that there are 100 pixel units 333, and all the 100 pixel units 333 need to implement light emitting via first currents. Because there is an equivalent resistance load and a parasitic capacitance load on the pixel branch 33, in first several periods in which the processor 31 outputs the pulse-width modulation signal, the first current flowing into is consumed by the equivalent resistance load and the parasitic capacitance load, and a degree to which the LED 3331 emits light is not reached. After the several periods (that is, after specific drive time), a current on the LED 3331 tends to be stable at a moment to, and a degree to which the LED 3331 emits light normally is reached. When a quantity of pixel units 333 that needs to emit light is large, a problem that a display apparatus 2 cannot perform normal display is caused because the total current value of all the second currents is small and drive time exceeds specified drive time. Therefore, the total current value of the second currents may be increased properly, for example, the total current value of the second currents is increased by 10 times. As shown in FIG. 17, when a ratio of a sum of all second currents to a sum of all first currents is 10:100, that is, when there are 100 pixel units 333 that need to emit light, a total current value of the second currents is increased by 10 times. In this case, although there is an equivalent resistance load and a parasitic capacitance load in the pixel branch 33, the first current can still quickly reach a stable state that enables the LED 3331 to emit light normally in an initial period of the pulse-width modulation signal.

In embodiments of the present disclosure, the processor 31 determines, based on the light-emitting state information, a quantity of pixel units 333 that currently needs to emit light. For example, when there is no pixel unit 333 that currently needs to emit light, the current source module 32 is controlled not to output a second current, to reduce power consumption. When 1 to 10 pixel units 333 need to emit light, a total current value of second currents is controlled to be one time a value of a reference current. One time the value of the reference current may be equal to a value of a first current flowing into a single second transistor 331. When 31 to 40 pixel units 333 need to emit light, a total current value of second currents is controlled to be four times the value of the reference current. When 91 to 100 pixel units 333 need to emit light, a total current value of second currents is controlled to be 10 times the value of the reference current.

In some possible implementations, a ratio of a channel width of the first transistor 3211 in each current source branch 321 to a channel length is equal.

In embodiments of the present disclosure, for example, the ratio of the channel width of the first transistor 3211 to the length is equal to 1a, and a ratio of a channel width of the second transistor 331 to a length is also 1a. In this case, a second current output by a single first transistor 3211 is equal to a first current flowing into a single second transistor 331. In this case, when the second current that is a specific multiple of the first current is required, the processor 31 may control a corresponding quantity of first transistors 3211 to be turned on. For example, if first transistors 3211 in five current source branches 321 are controlled to be turned on, five combined second currents may be output. In this case, a ratio of a channel width of the first transistor 3211 in each of the five conducted pixel branches 321 to a length may be considered as 5a, that is, a value of the second current is five times a value of a first current.

In some possible implementations, a ratio of a channel width of the first transistor 3211 in each current source branch 321 to a channel length is partially equal.

In embodiments of the present disclosure, for example, for different current source branches 321, a ratio of a channel width of a first transistor 3211 in each of a part of current source branches 321 to a channel length may be 1a, a ratio of a channel width of a first transistor 3211 in each of a part of current source branches 321 to a channel length may be 4a, and a ratio of a channel width of a first transistor 3211 in each of a part of current source branches 321 to a channel length may be 8a. The total current value of the second currents is adjusted by turning on one or more first transistors 3211 of different ratios.

In some possible implementations, a ratio of a channel width of the first transistor 3211 in each current source branch 321 to a channel length is completely unequal.

For example, in the plurality of current source branches 321, there is a proportional relationship between the ratios of the channel widths of the first transistors 3211 in all the current source branches 321 to the length.

In embodiments of the present disclosure, for example, a ratio of a channel width of a first transistor 3211 in a current source branch 321 to a channel length is 1a, a ratio of a channel width of a first transistor 3211 in a current source branch 321 to a channel length is 2a, a ratio of a channel width of a first transistor 3211 in a current source branch 321 to a channel length is 4a, a ratio of a channel width of a first transistor 3211 in a current source branch 321 to a channel length is 8a. In this case, the total current value of the second currents is adjusted by turning on one or more first transistors 3211 of different ratios. When ratios of channel widths to channel lengths of first transistors 3211 in different current source branches 321 are different and proportional to each other, a smaller quantity of current source branches 321 may be used for arrangement and combination to obtain second currents corresponding to current values required by pixel units 333 of different light-emitting quantities.

Embodiments of the present disclosure provide a display circuit, a display method, a display apparatus, and an electronic device. A plurality of current source branches and a plurality of pixel branches are disposed in the display circuit. Each current source branch includes a first transistor and a control circuit. Each pixel branch includes a second transistor and a pixel unit that are connected in series. The plurality of first transistors and the plurality of second transistors form current mirror structures. Whether each first transistor is turned on is controlled through the control circuit, to adjust a value of a current flowing through the pixel unit through the second transistor. A first current that is used as a drive current flows through the pixel branch. Each current source branch is used to output one second current, and a total current value of all the second currents is used to determine current values of first currents. In embodiments of the present disclosure, the total current value of the second currents output by the plurality of current source branches is adjusted, so that the current value of the first current is controlled, and a waste of power consumption caused by the second current and the first current is reduced as much as possible while the first current drives the pixel branch.

Figure 18:
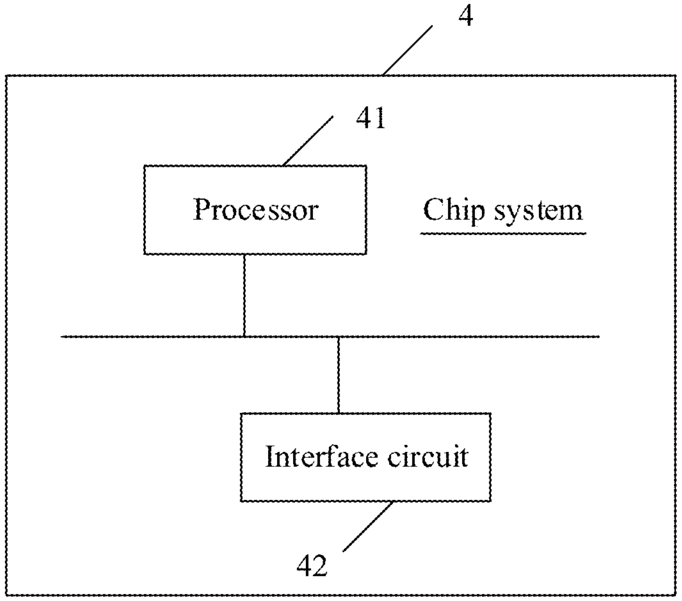
FIG. 18 is a diagram of a structure of a chip system according to an embodiment of the present disclosure.

An embodiment of the present disclosure further provides a chip system. As shown in FIG. 18, a chip system 4 includes at least one processor 41 and at least one interface circuit 42. The at least one processor 41 and the at least one interface circuit 42 may be interconnected through a line. The processor 41 is configured to support the chip system in implementing functions or steps in the foregoing method embodiments. The at least one interface circuit 42 may be configured to receive a signal from another apparatus (for example, a memory), or send a signal to another apparatus (for example, a communication interface). The chip system may include a chip, and may further include another discrete component.

An embodiment of the present disclosure further provides a computer-readable storage medium. The computer-readable storage medium includes instructions. When the instructions are run on the foregoing chip system or electronic device, the chip system or the electronic device is enabled to perform functions or steps in the foregoing method embodiments, for example, perform the method shown in FIG. 14.

An embodiment of the present disclosure further provides a computer program product including instructions. When the instructions are run on the foregoing chip system or electronic device, the chip system or the electronic device is enabled to perform functions or steps in the foregoing method embodiments, for example, perform the method shown in FIG. 14.

The processor in embodiments of the present disclosure may be a chip. For example, the processor may be a field-programmable gate array (FPGA), an application-specific integrated chip (ASIC), a system on chip (SoC), a central processing unit (CPU), a network processor (NP), a digital signal processing circuit (DSP), a microcontroller (MCU), a programmable controller (PLD), or another integrated chip.

The memory in embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. By way of example, and not limitation, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct Rambus random-access memory (DR RAM). It should be noted that the memory of the systems and methods described in this specification includes but is not limited to these and any memory of another proper type.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of embodiments of the present disclosure.

A person of ordinary skill in the art may be aware that, in combination with the examples described in embodiments disclosed in this specification, modules and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in the present disclosure, it should be understood that the disclosed system, devices, and methods may be implemented in other manners. For example, the foregoing device embodiment is merely an example. For example, division into the modules is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate components may or may not be physically separate, and components displayed as modules may or may not be physical modules, may be located in one device, or may be distributed on a plurality of devices. Some or all of the modules may be selected based on actual needs to achieve the objectives of the solutions of embodiments.

In addition, functional modules in embodiments of the present disclosure may be integrated into one device, or each of the modules may exist alone physically, or two or more modules are integrated into one device.

All or some of the foregoing embodiments may be implemented by using software, hardware, firmware, or any combination thereof. When a software program is used to implement embodiments, embodiments may be implemented fully or partially in a form of a computer program product. The computer program product includes one or more computer instructions. When the computer program instructions are loaded and executed on a computer, the procedures or functions according to embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (a digital versatile disc (DVD)), a semiconductor medium (for example, a solid-state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A display circuit comprising:

a plurality of current source branches, wherein each of a current source branch of the plurality of current source branches comprises:

a first transistor comprising a gate; and a control circuit coupled to the first transistor and configured to control a turn-on and a turn-off of the first transistor; and a plurality of pixel branches, wherein each of a pixel branch of the plurality of pixel branches comprises:
a second transistor coupled to the gate of the first transistor, wherein the second transistor and the first transistor form a current mirror;
a pulse width control switch transistor connected to the second transistor and configured to control conduction and disconnection of the pixel branch; and
a pixel unit connected to the pulse width control switch transistor,
wherein a first withstand voltage of the pulse width control switch transistor is different from a second withstand voltage of the second transistor and is greater than a power supply voltage of the pixel branch.

2. The display circuit according to claim 1, wherein the first withstand voltage of the pulse width control switch transistor is greater than the second withstand voltage of the second transistor.

3. The display circuit according to claim 2, wherein the pulse width control switch transistor is coupled between the second transistor and the pixel unit.

4. The display circuit according to claim 1, wherein the pulse width control switch transistor is configured to:
input a pulse-width modulation signal;
control, when the pulse-width modulation signal is at a first level, the pulse width control switch transistor to be turned on to control conduction of the pixel branch; and
control, when the pulse-width modulation signal is at a second level, the pulse width control switch transistor to be turned off to control disconnection of the pixel branch.

5. The display circuit according to claim 4, wherein the pulse-width modulation signal comprises a plurality of different duty cycles to control different display brightnesses of the pixel unit.

6. The display circuit according to claim 1, wherein only the second transistor and the pulse width control switch transistor are coupled between the pixel unit and a power supply of the pixel branch.

7. The display circuit according to claim 1, wherein the pixel unit is a light-emitting diode.

8. The display circuit according to claim 1, wherein the first transistor further comprises a first electrode and a second electrode, and wherein the control circuit comprises:
a first switch coupled between the first electrode of the first transistor and the gate of the first transistor; and
a second switch coupled between the second electrode of the first transistor and the gate of the first transistor.

9. The display circuit according to claim 1, wherein the pulse width control switch transistor is coupled between the second transistor and the pixel unit.

10. The display circuit according to claim 1, wherein the pulse width control switch transistor is configured to receive a pulse-width modulation signal to control conduction of the pixel branch.

11. The display circuit according to claim 1, wherein the control circuit adjusts a reference current of the current source branch based on a total current value of the pixel branches.

12. A method comprising:
controlling conduction and disconnection of a pixel branch of a display circuit through a pulse width control switch transistor of the pixel branch; and
controlling, through a control circuit of a current source branch of the display circuit and based on a current value of the pixel branch, a turn-on and a turn-off a first transistor of the current source branch to control the pixel branch,
wherein the pulse width control switch transistor has a first withstand voltage greater than a power-supply voltage of the pixel branch and different from a second withstand voltage of a second transistor of the pixel branch.

13. The method according to claim 12, wherein the controlling of the conduction and the disconnection of the pixel branch comprises:
controlling turn-on and turn-off of the pulse width control switch transistor via a pulse-width modulation signal;
controlling, when the pulse-width modulation signal is at a first level, the pulse width control switch transistor to be turned on to control conduction of the pixel branch; and
controlling, when the pulse-width modulation signal is at a second level, the pulse width control switch transistor to be turned off to control disconnection of the pixel branch.

14. The method according to claim 13, further comprising controlling different display brightnesses of a pixel unit of the pixel branch via different duty cycles of the pulse-width modulation signal.

15. The method according to claim 12, further comprising:
controlling a first switch of the control circuit to be turned on and a second switch of the control circuit to be turned off to control the first transistor to be turned on; or
controlling the first switch to be turned off and the second switch to be turned on to control the first transistor to be turned off.

16. A display apparatus comprising:
a display circuit comprising:
a plurality of current source branches, wherein each of a current source branch of the plurality of current source branches comprises:
a first transistor comprising a gate; and
a control circuit coupled to the first transistor and configured to control a turn-on and a turn-off of the first transistor; and
a plurality of pixel branches, wherein each of a pixel branch of the plurality of pixel branches comprises:
a second transistor coupled to the gate of the first transistor, wherein the second transistor and the first transistor form a current mirror;
a pulse width control switch transistor connected to the second transistor and configured to control conduction and disconnection of the pixel branch; and
a pixel unit connected to the pulse width control switch transistor, wherein a first withstand voltage of the pulse width control switch transistor is greater than a second withstand voltage of the second transistor; and
one or more processors configured to execute instructions to cause the display apparatus to control, through the control circuit of a current source branch of the display circuit and based on a current value of a pixel branch, a turn-on and a turn-off the first transistor of the current source branch to control the pixel branch.

17. The display apparatus according to claim 16, wherein the display apparatus is configured to emit light.

18. The display apparatus according to claim 16, wherein only the second transistor and the pulse width control switch transistor are coupled between the pixel unit and a power supply of the pixel branch.

19. The display apparatus according to claim 16, wherein the pixel unit is a light-emitting diode.

20. The display apparatus according to claim 16, wherein the first withstand voltage of the pulse width control switch transistor is greater than the second withstand voltage of the second transistor.

* * * * *